(12) United States Patent
Noguchi et al.

(10) Patent No.: US 12,162,140 B2
(45) Date of Patent: Dec. 10, 2024

(54) WIRELESS CONNECTOR ATTACHMENT/DETACHMENT METHOD, ROBOT DEVICE, AND WIRELESS CONNECTOR

(71) Applicant: Japan Aviation Electronics Industry, Limited, Tokyo (JP)

(72) Inventors: Hideyuki Noguchi, Tokyo (JP); Masayoshi Yoneda, Tokyo (JP); Hiromasa Tanaka, Tokyo (JP); Yuuri Nakamura, Tokyo (JP); Hidehiko Kuroda, Tokyo (JP)

(73) Assignee: Japan Aviation Electronics Industry, Limited, Tokyo (JP)

( * ) Notice: Subject to any disclaimer, the term of this patent is extended or adjusted under 35 U.S.C. 154(b) by 48 days.

(21) Appl. No.: 17/767,850

(22) PCT Filed: Oct. 2, 2020

(86) PCT No.: PCT/JP2020/037580
§ 371 (c)(1),
(2) Date: Apr. 8, 2022

(87) PCT Pub. No.: WO2021/124648
PCT Pub. Date: Jun. 24, 2021

(65) Prior Publication Data
US 2024/0033949 A1   Feb. 1, 2024

(30) Foreign Application Priority Data

Dec. 16, 2019  (JP) .................... 2019-226372

(51) Int. Cl.
*H02J 50/80* (2016.01)
*B25J 19/00* (2006.01)
*H02J 50/10* (2016.01)

(52) U.S. Cl.
CPC .......... *B25J 19/0045* (2013.01); *H02J 50/10* (2016.02)

(58) Field of Classification Search
CPC .... B25J 19/0045; B25J 19/00; B25J 19/0029; H02J 50/10; H02J 50/90
See application file for complete search history.

(56) References Cited

U.S. PATENT DOCUMENTS

2008/0197710 A1   8/2008 Kreitz et al.
2012/0242283 A1*  9/2012 Kim ...................... H04B 5/266
                                               320/108

(Continued)

FOREIGN PATENT DOCUMENTS

CN   203086197 U   7/2013
JP   H08-019985 A  1/1996

(Continued)

OTHER PUBLICATIONS

International Search Report in PCT/JP2020/037580, mailed Dec. 22, 2020.

*Primary Examiner* — Masud Ahmed
(74) *Attorney, Agent, or Firm* — Collard & Roe, P.C.

(57) ABSTRACT

A wireless connector for wirelessly transmitting a to-be-transmitted target that is electric power and/or information, has a first unit and a second unit removably attached from the outside of a first object and a second object, respectively. The first unit includes a first transmission/reception part for wirelessly transmitting the to-be-transmitted target; and a first housing to which a first connector part for transmitting the to-be-transmitted target to/from the first object by being attached to the first object is fixed. The second unit includes a second transmission/reception part for wirelessly transmitting the to-be-transmitted target to/from the first transmission/reception part; and a second housing to which a second connector part for transmitting the to-be-transmitted (Continued)

target to/from the second object by being attached to the second object is fixed. The first and the second transmission/reception parts are spaced apart from and faced to each other so as to wirelessly transmit the to-be-transmitted target.

13 Claims, 13 Drawing Sheets

(56) References Cited

U.S. PATENT DOCUMENTS

| | | | |
|---|---|---|---|
| 2016/0233687 A1* | 8/2016 | McKernan | B66F 9/22 |
| 2017/0098991 A1* | 4/2017 | Takahashi | H02J 50/80 |
| 2017/0244284 A1 | 8/2017 | Takahashi et al. | |
| 2018/0205266 A1 | 7/2018 | Miyamoto et al. | |
| 2020/0326387 A1* | 10/2020 | Li | H02J 7/02 |
| 2021/0159736 A1* | 5/2021 | Miyamoto | H02J 50/70 |
| 2022/0149668 A1* | 5/2022 | Matsumoto | H04L 25/085 |

FOREIGN PATENT DOCUMENTS

| | | |
|---|---|---|
| JP | H09-300270 A | 11/1997 |
| JP | 2012-518382 A | 8/2012 |
| JP | 2017-144530 A | 8/2017 |
| JP | 2018-512830 A | 5/2018 |
| JP | 2018-117511 A | 7/2018 |
| JP | 2019-213330 A | 12/2019 |
| JP | 2020-163498 A | 10/2020 |
| KR | 2019-0078107 A | 7/2019 |
| WO | 2010/093997 A1 | 8/2010 |

* cited by examiner though wireless power supply unit 100 which can easily be repaired even if Patent Document 1 is referred to.
WIRELESS CONNECTOR ATTACHMENT/DETACHMENT METHOD, ROBOT DEVICE, AND WIRELESS CONNECTOR

CROSS REFERENCE TO RELATED APPLICATIONS

This application is the National Stage of PCT/JP2020/037580 filed on Oct. 2, 2020, which claims priority under 35 U.S.C. § 119 of Japanese Application No. 2019-226372 filed on Dec. 16, 2019, the disclosure of which is incorporated by reference. The international application under PCT article 21(2) was not published in English.

TECHNICAL FIELD

The present invention relates to a wireless connector attachment/detachment method, a robot device, and a wireless connector.

BACKGROUND TECHNOLOGY

Technology for supplying electric power wirelessly to a load is known and applied to industrial robots or the like. For example, Patent Document 1 discloses an example in which joint portions J2 and J4 of a robot arm device are provided with wireless power supply units IHU2 and IHU4, respectively, as shown in FIG. 17A. The wireless power supply units IHU2 and IHU4 wirelessly transmit electric power at the joint portions J2 and J4 via a pair of coils.

A wireless power supply unit 100 (corresponding to the wireless power supply unit IHU2) is provided with a power transmission device 10 and a reception device 20, as shown in FIG. 17B. The power transmission device 10 is provided with a power transmission antenna 11 including a coil or the like, an inverter circuit 13, and a power transmission control circuit 15. The reception device 20 is provided with a power receiving antenna 21 including a coil or the like, and a rectifying circuit 23.

PRIOR ART DOCUMENT

Patent Document

Patent Document 1: JP 2018-117511 A

SUMMARY OF THE INVENTION

Problem to be Solved by the Invention

In general, a coil for wirelessly transmitting and receiving electric power often generates heat during operation, and a failure may occur in the wireless power supply unit 100 due to heat generation of the coil. Since the failure of the wireless power supply unit 100 may interfere with the operation of the robot arm device, it is desirable that the wireless power supply unit 100 can easily be repaired by replacement or the like of the wireless power supply unit 100.

However, Cited Patent Document 1 does not disclose how the joint portions J2 and J4 are provided with the wireless power supply unit 100, such as an arrangement of the pair of coils. Therefore, it is difficult to obtain the wireless power supply unit 100 which can easily be repaired even if Patent Document 1 is referred to.

The present invention has been made in view of the above-mentioned situation, and aims to provide a wireless connector capable of being easily repaired.

Means for Solving the Problem

In order to achieve the above-mentioned object, according to a first aspect of the present invention, there is provided a wireless connector attachment/detachment method for attaching/detaching a wireless connector to/from a first object and a second object, the wireless connector being configured to wirelessly transmit a to-be-transmitted target, which is at least one of electric power and information, between the first object and the second object which are rotatably connected with a rotation axis as a fulcrum,
 the wireless connector comprising:
  a first housing to which a first transmission/reception part configured to wirelessly transmit the to-be-transmitted target, and a first connector part configured to transmit the to-be-transmitted target to/from the first object are fixed, and
  a second housing to which a second transmission/reception part configured to wirelessly transmit the to-be-transmitted target to/from the first transmission/reception part, and a second connector part configured to transmit the to-be-transmitted target to/from the second object are fixed,
 wherein the wireless connector attachment/detachment method comprises:
  attaching the first connector part to the first object from an outside of the first object, and attaching the second connector part to the second object from an outside of the second object, thereby attaching the wireless connector to the first object and the second object in a state where the first transmission/reception part and the second transmission/reception part are spaced from and faced to each other so as to wirelessly transmit the to-be-transmitted target, and
  detaching the first connector part from the first object by work outside the first object, and detaching the second connector part from the second object by work outside the second object, thereby detaching the wireless connector from the first object and the second object.

In order to achieve the above-mentioned object, according to a second aspect of the present invention, there is provided a robot device comprising:
 a first arm part and a second arm part which are connected via a joint mechanism configured to rotatably connect the first and the second arm parts with a rotation axis as a fulcrum, and
 a wireless connector configured to wirelessly transmit a to-be-transmitted target, which is at least one of electric power and information, between the first arm part and the second arm part,
 wherein:
 the first arm part includes a first mating connector part exposed to an outside of the first arm part, and
 the second arm part includes a second mating connector part exposed to an outside of the second arm part,
 wherein the wireless connector comprises:
 a first housing to which a first transmission/reception part configured to wirelessly transmit the to-be-transmitted target, and a first connector part configured to transmit the to-be-transmitted target to/from the first object by being removably attached to the first mating connector are fixed; and a second housing to which a second transmission/reception part configured to wirelessly transmit the to-be-transmitted target to/from the first transmission/reception part, and a second connector part configured to transmit the to-be-transmitted target to/from the second object by being removably attached to the second mating connector are fixed, wherein, when the first connector part and the second connector part are attached to the first mating connector part and the second mating connector part, respectively, the first transmission/reception part and the second transmission/reception part are arranged to be spaced from and faced to each other along the rotation axis so as to wirelessly transmit the to-be-transmitted target outside the joint mechanism.

In order to achieve the above-mentioned object, according to a third aspect of the present invention, there is provided a wireless connector for wirelessly transmitting a first to-be-transmitted target, which is electric power, between a first object and a second object, wherein the wireless connector comprises:

a first unit removably attached to the first object from an outside of the first object, and a second unit removably attached to the second object from an outside of the second object, wherein the first unit comprises:

a first transmission/reception part configured to wirelessly transmit the first to-be-transmitted target;

a first connector part configured to transmit the first to-be-transmitted target to/from the first object by being removably attached to the first object from the outside of the first object; and a first housing to which the first transmission/reception part and the first connector part are fixed, wherein the second unit comprises:

a second transmission/reception part configured to wirelessly transmit the first to-be-transmitted target to/from the first transmission/reception part;

a second connector part configured to transmit the first to-be-transmitted target to/from the second object by being removably attached to the second object from the outside of the second object; and a second housing to which the second transmission/reception part and the second connector part are fixed, wherein, when the first unit and the second unit are attached to the first object and the second object, respectively, the first transmission/reception part and the second transmission/reception part are arranged to be spaced from and faced to each other so as to wirelessly transmit the first to-be-transmitted target.

The first transmission/reception part includes a first coil member of a flat-plate-like shape configured to transmit the first to-be-transmitted target; the second transmission/reception part includes a second coil member of a flat-plate-like shape configured to transmit the first to-be-transmitted target by magnetic-field coupling with the first coil member;

wherein, when the first unit and the second unit are attached to the first object and the second object, respectively, the first coil member and the second coil member are arranged in parallel in a state of being spaced from and faced to each other so as to wirelessly transmit the first to-be-transmitted target.

The first unit further includes a third transmission/reception part fixed to the first housing and configured to wirelessly transmit a second to-be-transmitted target that is information;

the second unit further includes a fourth transmission/reception part fixed to the second housing and configured to wirelessly transmit the second to-be-transmitted target to/from the third transmission/reception part;

the first connector part is configured to transmit the first to-be-transmitted target and the second to-be-transmitted target to/from the first object by being removably attached to the first object from the outside of the first object;

the second connector part is configured to transmit the first to-be-transmitted target and the second to-be-transmitted target to/from the second object by being removably attached to the second object from the outside of the second object;

wherein, when the first unit and the second unit are attached to the first object and the second object, respectively, the third transmission/reception part and the fourth transmission/reception part are arranged to be spaced from and faced to each other so as to wirelessly transmit the second to-be-transmitted target.

The third transmission/reception part includes a first antenna member configured to transmit the second to-be-transmitted target that is information;

the fourth transmission/reception part includes a second antenna member configured to transmit the second to-be-transmitted target;

the first transmission/reception part is provided around the third transmission/reception part;

the second transmission/reception part is provided around the fourth transmission/reception part;

wherein, when the first unit and the second unit are attached to the first object and the second object, respectively, the first antenna member and the second antenna member are arranged in parallel in a state of being spaced from and faced to each other so as to wirelessly transmit the second to-be-transmitted target.

In order to achieve the above-mentioned object, according to a fourth aspect of the present invention, there is provided a wireless connector for wirelessly transmitting, between a first object and a second object, at least one of electric power and information as a to-be-transmitted target, wherein the wireless connector comprises:

a first unit removably attached to the first object from an outside of the first object, and a second unit removably attached to the second object from an outside of the second object, wherein the first unit comprises:

a first transmission/reception part including a first coil member configured to wirelessly transmit the to-be-transmitted target;

a first connector part removably attached to the first object so as to transmit the to-be-transmitted target to/from the first object by being fitted to the first object from the outside of the first object; and a first housing to which the first coil member and the first connector part are fixed, wherein the second unit comprises:

a second transmission/reception part including a second coil member configured to wirelessly transmit the to-be-transmitted target to/from the first coil member;

a second connector part removably attached to the second object so as to transmit the to-be-transmitted target to/from the second object by being fitted to the second object from the outside of the second object; and a second housing to which the second coil member and the second connector part are fixed, the first connector part and the second connector part having the same fitting direction, the first coil member and the second coil member being arranged to be spaced from and faced to each other along the fitting direction to cause magnetic field coupling therebetween.

The first coil member is disposed around a first central axis;

the second coil member is disposed around a second central axis;

the first central axis and the second central axis are parallel to the fitting direction.

In order to achieve the above-mentioned object, according to a fifth aspect of the present invention, there is provide a wireless connector for wirelessly transmitting, between a first object and a second object, at least one of electric power and information as a to-be-transmitted target, wherein the wireless connector comprises:

a first unit removably attached to the first object from an outside of the first object; and a second unit removably attached to the second object from an outside of the second object, wherein the first unit comprises:

a first transmission/reception part including a first coil member configured to wirelessly transmit the to-be-transmitted target;

a first connector part configured to transmit the to-be-transmitted target to/from the first object by being removably attached to the first object from the outside of the first object; and a first housing to which the first transmission/reception part and the first connector part are fixed, wherein the second unit comprises:

a second transmission/reception part including a second coil member configured to wirelessly transmit the to-be-transmitted target to/from the first transmission/reception part;

a second connector part configured to transmit the to-be-transmitted target to/from the second object by being removably attached to the second object from the outside of the second object; and a second housing to which the second transmission/reception part and the second connector part are fixed, wherein the first coil member and the second coil member are spaced from and faced to each other in a state of being coupled to each other by magnetic field coupling.

In order to achieve the above-mentioned object, according to a sixth aspect of the present invention, there is provided a wireless connector for wirelessly transmitting, between a first object and a second object, a to-be-transmitted target which is at least one of electric power and information, wherein the wireless connector comprises: a first unit removably attached to the first object from an outside of the first object; and a second unit removably attached to the second object from an outside of the second object, wherein the first unit comprises:

a first transmission/reception part configured to wirelessly transmit the to-be-transmitted target;

a first connector part configured to transmit the to-be-transmitted target to/from the first object by being attached to the first object; and a first housing to which the first transmission/reception part is fixed and to which the first connector part is attached, wherein the second unit comprises:

a second transmission/reception part configured to wirelessly transmit the to-be-transmitted target to/from the first transmission/reception part;

a second connector part configured to transmit the to-be-transmitted target to/from the second object by being attached to the second object; and a second housing to which the second transmission/reception part is fixed and to which the second connector part is attached, wherein the first transmission/reception part and the second transmission/reception part are arranged to be spaced from and faced to each other so as to wirelessly transmit the to-be-transmitted target when the first unit and the second unit are attached to the first object and the second object, respectively.

The first object and the second object are rotatably connected with a rotation axis as a fulcrum.

When the first unit and the second unit are attached to the first object and the second object, respectively, the first transmission/reception part and the second transmission/reception part are arranged to be spaced from and faced to each other along the rotation axis.

The first unit and the second unit are spaced from each other when the first unit and the second unit are attached to the first object and the second object, respectively.

The first unit and the second unit further include a guide mechanism configured to limit a relative positional relationship between the first transmission/reception part and the second transmission/reception part within a predetermined range when the first unit and the second unit are attached to the first object and the second object, respectively.

Effect of the Invention

According to the present invention, the wireless connector can easily be repaired.

MODE FOR CARRYING OUT THE INVENTION

Figure 1:
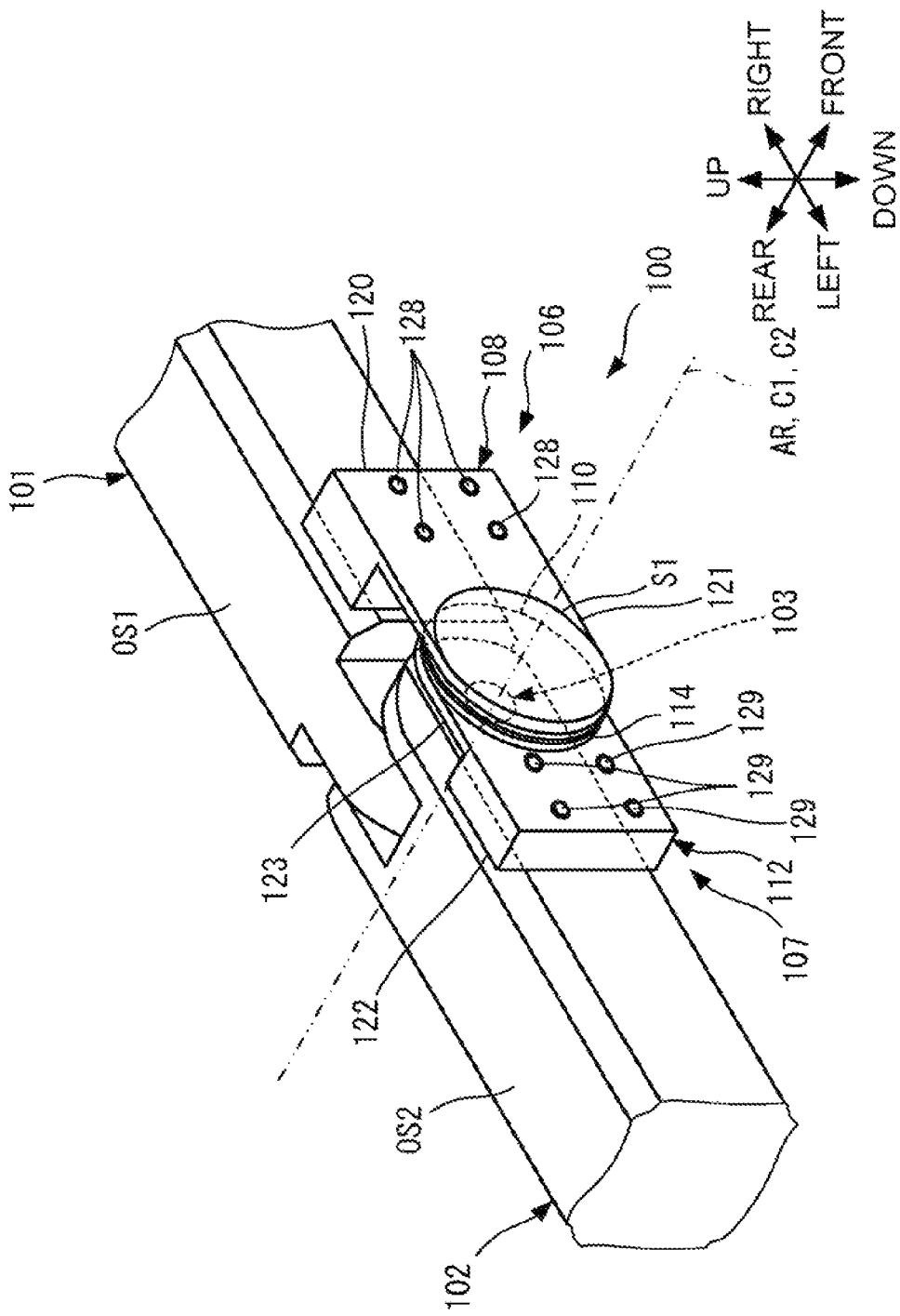
FIG. 1 is a perspective view of a wireless connector attached to a first arm part and a second arm part according to a first embodiment of the present invention.

Hereinafter, wireless connectors according to embodiments of the present invention will be described with reference to the drawings. Throughout all drawing figures, the same elements are assigned with the same reference numerals.

First Embodiment (Configuration of Wireless Connector 100 according to First Embodiment)

Figure 2:
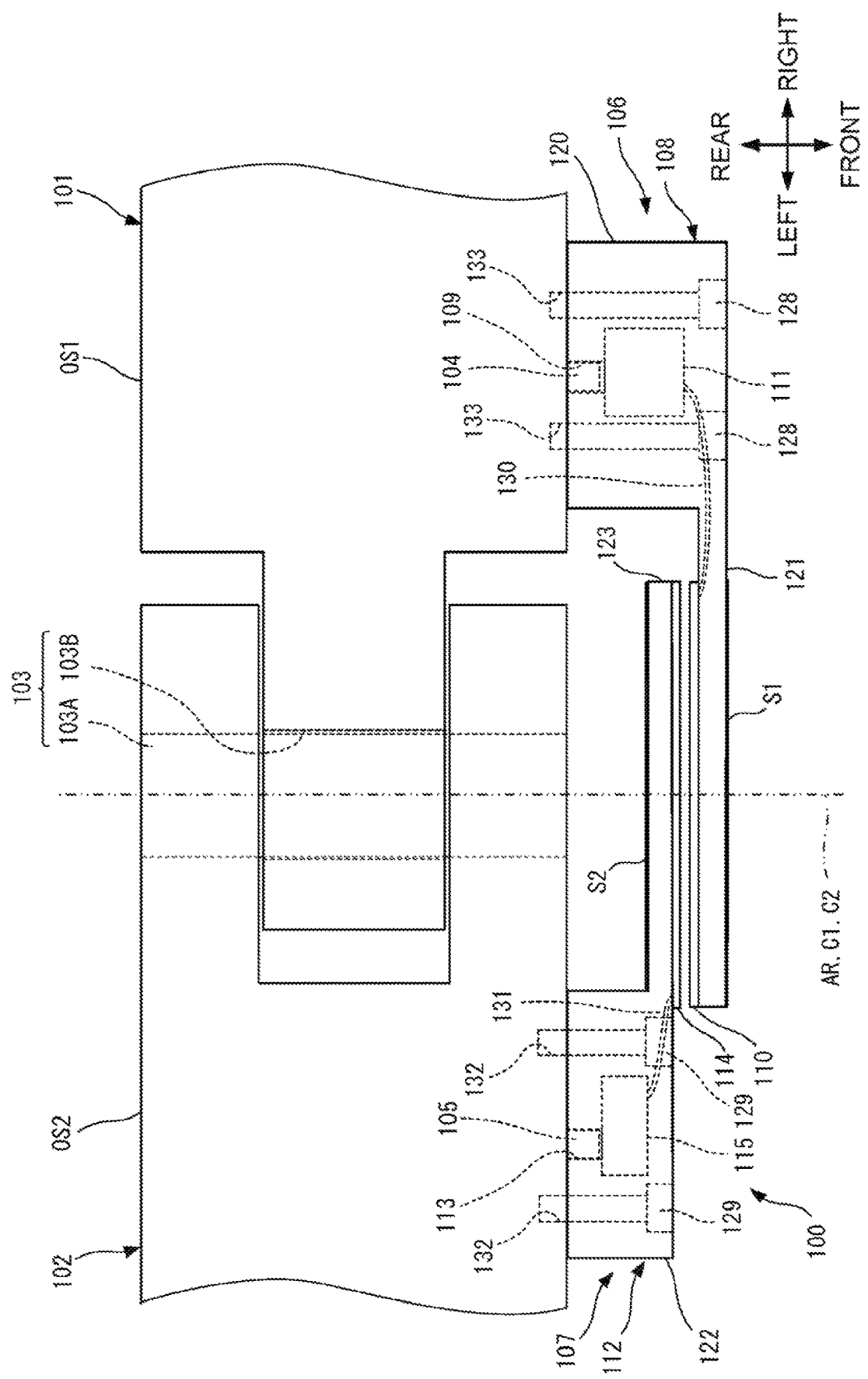
FIG. 2 is a view of the wireless connector attached to the first arm part and the second arm part according to the first embodiment as viewed from above.
Figure 3:
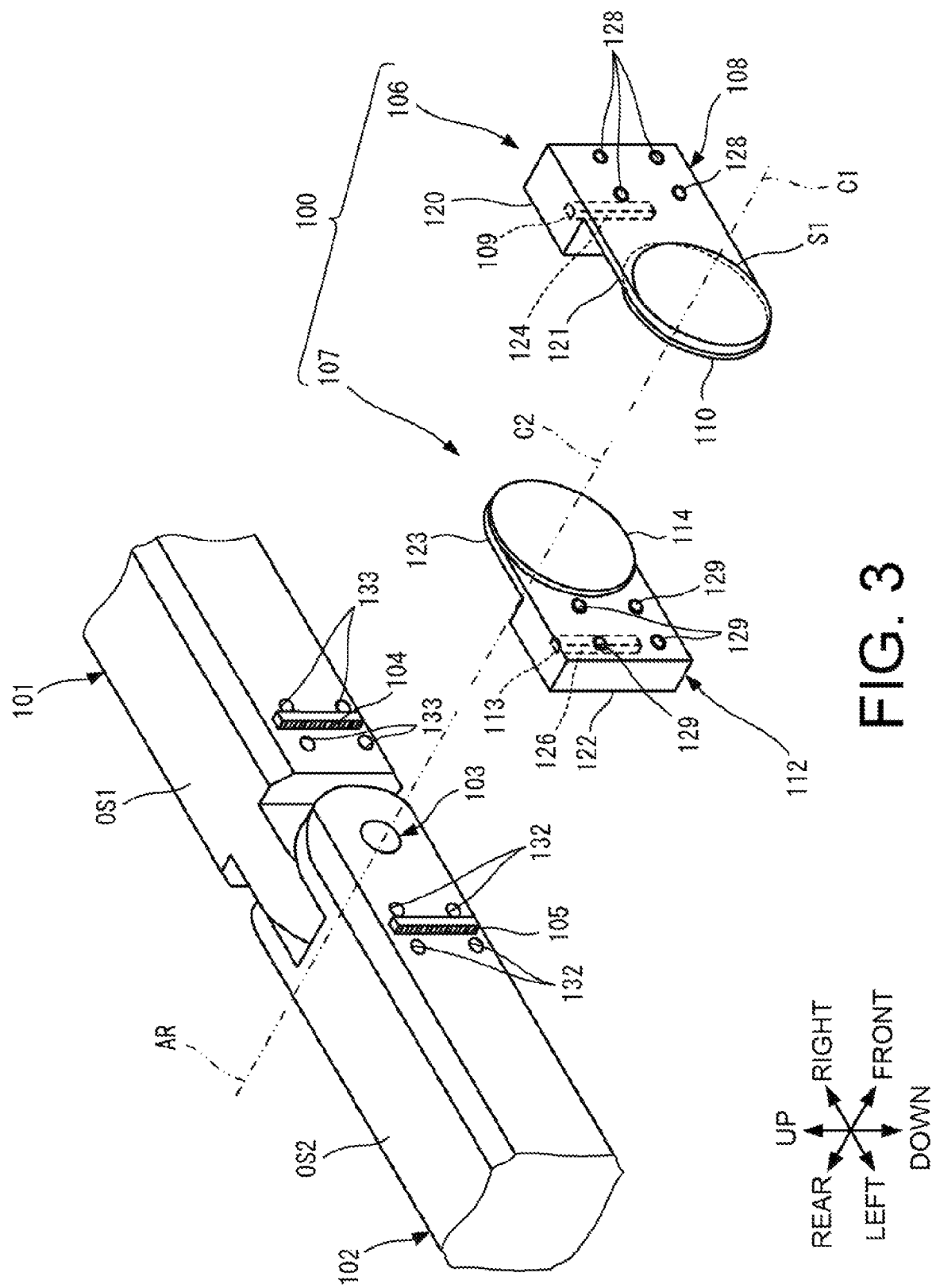
FIG. 3 is an exploded perspective view of the first arm part, the second arm part, and the wireless connector according to the first embodiment.

A wireless connector 100 according to a first embodiment of the present invention is a connector for wirelessly transmitting electric power between a first arm part 101 and a second arm part 102 as shown in a perspective view of FIG. 1, a plan view of FIG. 2, and an exploded perspective view of FIG. 3. The wireless connector 100 is removably attached to an outside of the first arm part 101 and the second arm part 102. In the present embodiment, an example in which electric power is transmitted wirelessly by magnetic field coupling (in detail, electromagnetic induction) will be described.

The arm parts 101, 102 are connected to each other via a joint mechanism 103 in a robot device such as an industrial robot and a humanoid robot. Here, the "arm parts 101, 102" is a generic term including the first arm part 101 and the second arm part 102. The same applies also in the following. The arm parts 101, 102 are covered with outer shells OS1, OS2, respectively, and a mechanism and wiring inside those parts are not exposed.

The joint mechanism 103 is a mechanism for connecting the first arm part 101 and the second arm part 102 so that they are rotatable with a rotation axis AR as a fulcrum. Thus, the first arm part 101 and the second arm part 102 are connected to be bendable and stretchable.

For example, the joint mechanism 103 according to the present embodiment is configured by fitting a shaft part 103A fixed to the second arm part 102 and a hole part 103B formed in the first arm part 101 to each other. The joint mechanism 103 connects the arm parts 101, 102 so that a shaft center of the shaft part 103A can be rotated as the rotation axis AR.

Any one of the first arm part 101 and the second arm part 102 may be a power supply side. In the present embodiment, an example in which the first arm part 101 is the power supply side while the second arm part 102 is a load side will be described.

For example, when the first arm part 101 and the second arm part 102 are included in the industrial robot, another member (another arm part, base, or the like) is connected to an end portion (not shown) of the first arm part 101 on the side opposite to the joint mechanism 103. Further, another member (another arm part, a hand part for holding a component, or the like) is connected to an end portion (not shown) of the second arm part 102 on the side opposite to the joint mechanism 103.

A load in this case is, for example, an actuator, a control circuit, or the like, which is mounted to the second art part 102 and another member connected thereto, and may include a motor provided in the joint mechanism 103 to rotate the first arm part 101 and the second arm part 102.

In the following description, terms indicating upward, downward, frontward, rearward, rightward and leftward directions are used as defined in a state where the arm parts 101,102 with the wireless connector 100 attached thereto are extended straight.

Specifically, a direction along the rotation axis AR is defined as a back-and-forth direction, and a direction along the arm parts 101, 102 is defined as a right-and-left direction. In addition, a direction in which parts (a first transmission/reception part 110 and a second transmission/reception part 114, which will later be described) facing each other in order to wirelessly transmit electric power in the wireless connector 100 are positioned with respect to the arm parts 101, 102 is defined as a front side, and a direction opposite thereto is defined as a rear side. Each of the upward, the downward, the leftward, and the rightward directions is defined according to a direction viewed from the front side.

It is to be noted that those terms indicating the directions are used for the purpose of explanation and are not intended to limit the present invention.

The first arm part 101 and the second arm part 102 include a first mating connector part 104 and a second mating connector part 105, respectively. The first mating connector part 104 and the second mating connector part 105 are connectors for transmitting electric power to/from the wireless connector 100, and are provided in the first arm part 101 and the second arm part 102, respectively, to be exposed to the outside.

Each of the first mating connector part 104 and the second mating connector part 105 according to the present embodiment is a male-side electric connector including a plurality of electric contacts arranged at intervals in the up-and-down direction.

Specifically, the first mating connector part 104 is provided on the right side of the rotation axis AR, and protrudes forward from a front surface of the outer shell OS1 of the first arm part 101. The second mating connector part 105 is provided on the left side of the rotation axis AR, and protrudes forward from a front surface of the outer shell OS2 of the second arm part 102.

As shown in FIGS. 1 to 3, the wireless connector 100 includes a first unit 106 and a second unit 107 which are removably attached to the first arm part 101 and the second arm part 102, respectively, from the outside.

The first unit 106 and the second unit 107 according to the present embodiment are spaced from each other without contacting each other. Therefore, when the first unit 106 and the second unit 107 are attached to the first arm part 101 and the second arm part 102, respectively, they can be rotated relative to each other around the rotation axis AR.

Figure 4:
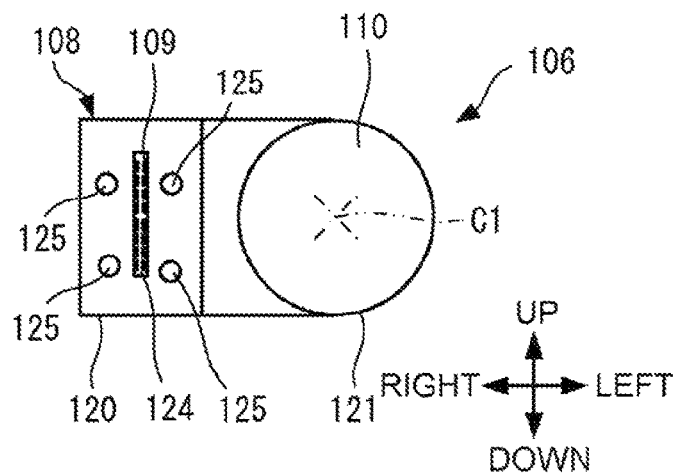
FIG. 4 is a view of a first unit according to the first embodiment as viewed from the rear.
Figures 5A, 5B:
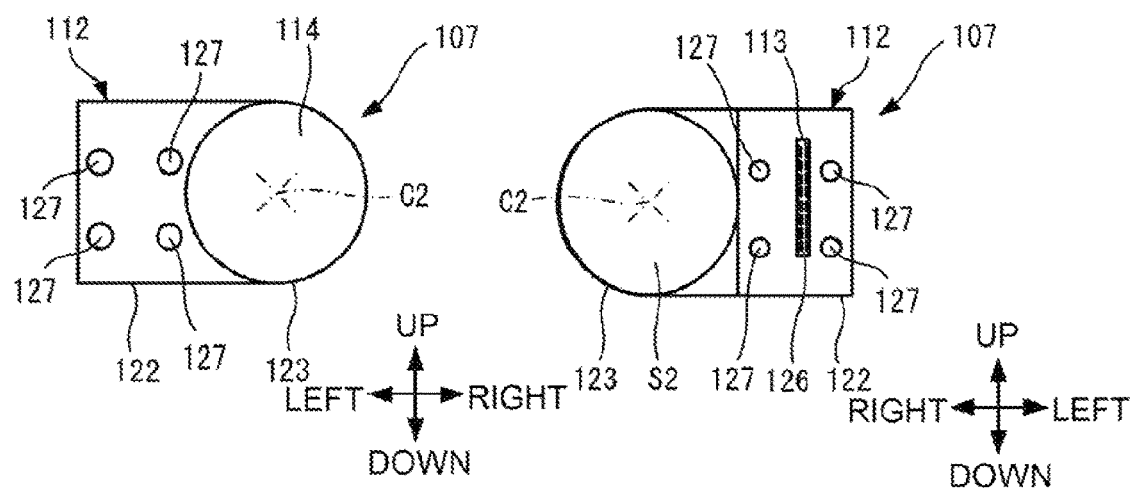
FIG. 5A is a view of a second unit according to the first embodiment as viewed from the front.
FIG. 5B is a view of the second unit according to the first embodiment as viewed from the rear.

As shown in FIGS. 1 to 3 and FIG. 4 as viewed from the rear, the first unit 106 includes a first housing 108, a first connector part 109, the first transmission/reception part 110, and a first circuit part 111. In FIG. 4, first bolts 128 to be described later are omitted.

As shown in FIGS. 1 to 3 and 5, the second unit 107 includes components 112 to 115 corresponding to the components 108 to 111 included in the first unit 106, respectively. Specifically, the second unit 107 includes a second housing 112, a second connector part 113, the second transmission/reception part 114, and a second circuit part 115. In FIGS. 5A and 5B, the second unit 107 is viewed from the front and the rear, respectively, and second bolts 129 to be described later are not shown in these figures.

The first housing 108 and the second housing 112 are members to which other components 109 to 111, 113 to 115 included in the first unit 106 and the second unit 107, respectively, are attached, and are typically made of hollow resin.

The first housing 108 according to the present embodiment includes a first arm mounting part 120 to be attached to the first arm part 101, and a first facing part 121. The second housing 112 includes a second arm mounting part 122 to be attached to the second arm part 102, and a second facing part 123 disposed to be spaced from and faced to the first facing part 121 along the rotation axis AR.

Each of the first arm mounting part 120 and the second arm mounting part 122 forms a substantially rectangular parallelepiped outer shape. The first arm mounting part 120 and the second arm mounting part 122 have substantially the same size except for a length in the back-and-forth direction, and the length in the back-and-forth direction of the first arm mounting part 120 is longer than that of the second arm mounting part 122.

Specifically, the first arm mounting part 120 includes a first opening 124 and four first bolt holes 125. The second arm mounting part 122 includes a second opening 126 and four second bolt holes 127.

The first opening 124 and the second opening 126 are provided in a rear wall portion so as to connect spaces inside the first arm mounting part 120 and the second arm mounting part 122 to the outside, respectively. The first connector part 109 and the second connector part 113 which will later be described in detail are provided on an inner side (front side) of the first opening 124 and an inner side (front side) of the second opening 126, respectively.

Each of the first bolt holes 125 and the second bolt holes 127 is a through hole in the back-and-forth direction. The first bolts 128 for fixing the first housing 108 to the first arm part 101 are arranged in the first bolt holes 125 in a penetrated state. The second bolts 129 for fixing the second housing 112 to the second arm part 102 are arranged in the second bolt holes 127 in a penetrated state.

The first facing part 121 and the second facing part 123 are flat-plate-shaped parts whose respective base ends are connected to a left end of the first arm mounting part 120 and a right end of the second arm mounting part 122, respectively, and which extend in mutually approaching directions. Thus, the first facing part 121 and the second facing part 123 are spaced from and faced to each other along the rotation axis AR.

Specifically, the first facing part 121 has the base end connected to the left end of the first arm mounting part 120, and extends leftward from the base end with its front surface flush with a front surface of the first arm mounting part 120. The first facing part 121 extends from the base end at a constant height substantially same as a height of the first arm mounting part 120, and has a semicircular shape protruding leftward when viewed from the front. Here, the "height" is the length in the up-and-down direction. The same applies also in the following.

The second facing part 123 has the base end connected to the right end of the second arm mounting part 122, and extends rightward from the base end with its front surface flush with a front surface of the second arm mounting part 122. The second facing part 123 extends from the base end at a constant height substantially same as a height of the second arm mounting part 122, and has a semicircular shape protruding rightward when viewed from the front.

The first facing part 121 has a thickness which is thinner than a difference between thicknesses of the first arm mounting part 120 and the second arm mounting part 122. Thus, the first facing part 121 has a tip which is arranged in front of the second facing part 123 with a space left therefrom. The first facing part 121 and the second facing part 123 are arranged in a state where substantially circular regions including the respective tips thereof are spaced from and faced to each other along the rotation axis AR outside the joint mechanism 103. The second facing part 123 has a thickness which may be set as appropriate but is thinner than the second arm mounting part 122. In the present embodiment, the thickness of the second facing part 123 is substantially same as the thickness of the first facing part 121. Here, the "thickness" is the length in the back-and-forth direction. The same applies also in the following.

The first connector part 109 is a part for transmitting electric power to/from the first arm part 101. The first connector part 109 is removably attached to the first arm part 101 from the outside of the first arm part 101. The first connector part 109 is attached to the first mating connector part 104, thereby transmitting electric power to/from the first arm part 101.

The first connector part 109 according to the present embodiment is an electric connector on a female side fixed to the first housing 108, and includes a plurality of electric contacts arranged at intervals in the up-and-down direction in front of the first opening 124. As a result, the first connector part 109 is exposed to an outside of the first housing 108 through the first opening 124, so that the first connector part 109 and the first mating connector part 104 inserted through the first opening 124 from the rear of the first housing 108 are fitted to each other in the back-and-forth direction. The first connector part 109 and the first mating connector part 104 fitted to each other are electrically connected to each other by bringing their respective electric contacts into contact with each other, so that electric power can be transmitted.

The relationship between the female side and a male side of the first connector part 109 and the first mating connector part 104 may be replaced. The first mating connector part 104, also in case of being the female side, only has to be exposed to the outside of the first arm part 101, whereby the first connector part 109 can removably be attached from the outside of the first arm part 101. Specifically, for example, an opening is provided in the outer shell OS1 of the first arm part 101, and the electric contacts constituting the first mating connector part 104 may be provided inside the opening.

The second connector part 113 is a part for transmitting electric power to/from the second arm part 102. The second connector part 113 is removably attached to the second arm part 102 from the outside of the second arm part 102. The second connector part 113 is attached to the second mating connector part 105, thereby transmitting electric power to/from the second arm part 102.

The second connector part 113 according to the present embodiment is an electric connector on the female side fixed to the second housing 112, and includes a plurality of electric contacts arranged at intervals in the up-and-down direction in front of the second opening 126. As a result, the second connector part 113 is exposed to an outside of the second housing 112 through the second opening 126, so that the second connector part 113 and the second mating connector part 105 inserted through the second opening 126 from the rear of the second housing 112 are fitted to each other in the back-and-forth direction. The second connector part 113 and the second mating connector part 105 fitted to each other are electrically connected to each other by bringing their respective electric contacts into contact with each other, so that electric power can be transmitted.

The relationship between the female side and the male side of the second connector part 113 and the second mating connector part 105 may be replaced. The second mating connector part 105, also in case of being the female side, only has to be exposed to the outside of the second arm part 102, whereby the second connector part 113 can removably be attached from the outside of the second arm part 102. Specifically, for example, an opening is provided in the outer shell OS2 of the second arm part 102, and the electric contacts constituting the second mating connector part 105 may be provided inside the opening.

The first transmission/reception part 110 and the second transmission/reception part 114 are members for wirelessly transmitting electric power therebetween, and are disposed to be spaced from and faced to each other along the rotation axis AR outside the joint mechanism 103 so as to wirelessly transmit electric power. Typically, the first transmission/reception part 110 and the second transmission/reception part 114 have a shape centered on a first central axis C1 and a second central axis C2, respectively, for example, a disc shape.

In the present embodiment, the first transmission/reception part 110 is fixed to an outer surface of the rear of the first facing part 121 by, for example, an adhesive, a screw or the like so that its outer edge substantially coincides with the tip of the first facing part 121. The second transmission/reception part 114 is fixed to an outer surface of the front of the second facing part 123, for example, by an adhesive, a screw, or the like so that its outer edge substantially coincides with the tip of the second facing part 123.

As a result, the first transmission/reception part 110 and the second transmission/reception part 114 are fixed to regions facing each other along the rotation axis AR of the first facing part 121 and the second facing part 123, respectively. Therefore, the first transmission/reception part 110 and the second transmission/reception part 114 are arranged so as to face each other along the rotation axis AR outside the joint mechanism 103. The first transmission/reception part 110 and the second transmission/reception part 114 are arranged in a separated state without coming into contact with each other, and preferably arranged to be in parallel with each other and to face a direction perpendicular to the rotation axis AR.

The first transmission/reception part 110 and the second transmission/reception part 114 according to the present embodiment are a first coil member and a second coil member, respectively, which are disc-shaped and substantially same in size. That is, the first coil member has a disc shape centered on the first central axis C1. The second coil member has a disc shape centered on the second central axis C2.

Each of the first coil member and the second coil member may be constituted of, for example, a conductor spirally wound around the central axis C1 or C2, a printed wiring spirally printed on a substrate around the central axis C1 or C2, or the like.

Since the first coil member and the second coil member are arranged so as to face each other along the rotation axis AR, they are magnetically coupled by electromagnetic induction. Thus, electric power can be wirelessly transmitted between the first coil member and the second coil member.

Here, in order to strengthen the coupling (magnetic field coupling in this embodiment) between the first transmission/reception part 110 and the second transmission/reception part 114, an area (facing area) of regions facing each other is desirably large, and the three axes AR, C1 and C2 are desirably coincident. However, it is only necessary that the first transmission/reception part 110 and the second transmission/reception part 114 are arranged to face each other along the rotation axis AR so as to transmit electric power (so as to cause magnetic field coupling in the present embodiment) and the three axes AR, C1, C2 may not be coincident due to a manufacturing error, a design constraint, or the like.

In the present embodiment, sheet-like shield members S1, S2 made of a metal, a soft magnetic material, or the like are provided in front of the first transmission/reception part 110 and at the rear of the second transmission/reception part 114, respectively. As a result, the first transmission/reception part 110 and the second transmission/reception part 114 are sandwiched by the shield members S1, S2 along the rotation axis AR, so that electromagnetic waves emitted to the outside can be suppressed.

The first transmission/reception part 110 may further include a capacitor or the like connected in series or in parallel with the first coil member, and may further include a resin case in which the first coil member or the like is accommodated. Similarly, the second transmission/reception part 114 may further include a capacitor or the like connected in series or in parallel with the second coil member, and may further include a resin case in which the second coil member or the like is housed.

The first circuit part 111 is an electric circuit electrically connected to the first connector part 109 and the first transmission/reception part 110. The first circuit part 111 is fixed inside the first housing 108 while being electrically connected to each of the first connector part 109 and the first transmission/reception part 110.

In the present embodiment, the first circuit part 111 is fixed to a front end of the first connector part 109, and the first circuit part 111 and the first transmission/reception part 110 are electrically connected to each other via a first lead wire 130.

In the present embodiment, as described above, the first arm part 101 is a power supply side. Therefore, the first circuit part 111 is a power transmission circuit and includes, for example, an inverter circuit for converting electric power supplied from the first arm part 101 through the first connector part 109 into electric power to be output to the first transmission/reception part 110.

The second circuit part 115 is an electric circuit electrically connected to the second connector part 113 and the second transmission/reception part 114. The second circuit part 115 is fixed inside the second housing 112 while being electrically connected to each of the second connector part 113 and the second transmission/reception part 114.

In the present embodiment, the second circuit part 115 is fixed to a front end of the second connector part 113, and the second circuit part 115 and the second transmission/reception part 114 are electrically connected to each other via a second lead wire 131.

In the present embodiment, as described above, the second arm part 102 is a load side. Therefore, the second circuit part 115 is a power reception circuit and includes, for example, a rectifying/smoothing circuit for converting the electric power received by the second transmission/reception part 114 magnetically coupled to the first transmission/reception part 110 into electric power to be output to the second arm part 102 through the second connector part 113.

Hereinbefore, the configuration of the wireless connector 100 according to the first embodiment of the present invention has been described.

In general, when the first unit 106 and the second unit 107 are attached to the arm parts 101 and 102, there is a possibility that a designed rotation axis (for example, an axis coinciding with the first central axis C1 and the second central axis C2) does not coincide with the rotation axis AR due to a manufacturing error or the like. The first unit 106 and the second unit 107 according to the present embodiment are spaced from each other without coming into contact with each other as described above. Therefore, even if the designed rotation axis is not coincident with the rotation axis AR, they can be rotated around the rotation axis AR in accordance with bending of the arm parts 101, 102.

The first unit 106 and the second unit 107 are spaced from each other without being in contact with each other. Therefore, even if they are relatively rotated, abrasion is hardly generated, and the durability of the wireless connector 100 can be improved.

(Operation of Wireless Connector 100 According to First Embodiment)

Hereinafter, the operation of the wireless connector 100 according to the present embodiment will be described with reference to the circuit configuration diagram of FIG. 6.

Figure 6:
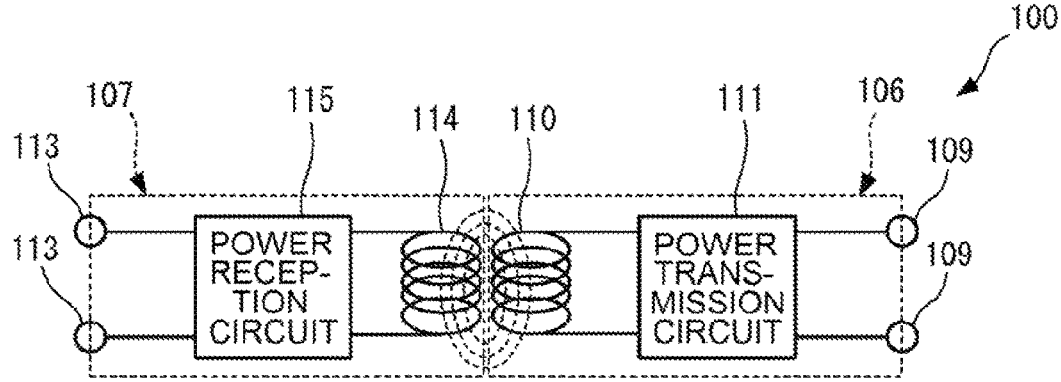
FIG. 6 is a circuit configuration diagram of the wireless connector according to the first embodiment.

Electric power supplied from the first arm part 101 (power source side) is supplied to the first transmission/reception part 110 through the first connector part 109 and the first circuit part 111 as shown in FIG. 6. Thus, an AC current flows through the first transmission/reception part 110, and a magnetic field is generated around the first transmission/reception part 110.

The first transmission/reception part 110 and the second transmission/reception part 114 are arranged to be spaced from and faced to each other along the rotation axis AR, as described above. Therefore, the first transmission/reception part 110 and the second transmission/reception part 114 are magnetically coupled, and an induced electromotive force corresponding to the magnetic field generated around the first transmission/reception part 110 is generated in the second transmission/reception part 114. That is, in the present embodiment, the first coil member constituting the first transmission/reception part 110 functions as a power transmission coil while the second coil member constituting the second transmission/reception part 114 functions as a power reception coil.

The electric power generated in the second transmission/reception part 114 is supplied to the second arm part 102 (load side) through the second circuit part 115 and the second connector part 113. Thus, electric power can be transmitted wirelessly between the first arm part 101 and the second arm part 102 by the wireless connector 100.

In the present embodiment, as described above, the arm parts 101, 102 are bent and stretched by rotating around the rotation axis AR and, in accordance therewith, the first unit 106 and the second unit 107 rotate around the rotation axis AR.

Since the transmission/reception parts 110, 114 are arranged to be spaced from and faced to each other along the rotation axis AR, magnetic field coupling is performed by electromagnetic induction even when the first unit 106 and the second unit 107 are rotated. Therefore, regardless of a bending/stretching state of the arm parts 101, 102 and even if the arm parts 101, 102 are during a bending/stretching operation, the wireless connector 100 can operate similarly to the above-described operation, so that electric power can be wirelessly transmitted between the first arm part 101 and the second arm part 102. Here, the "transmission/reception parts 110, 114" is a generic term including the first transmission/reception part 110 and the second transmission/reception part 114. The same applies also in the following.

Preferably, the transmission/reception parts 110, 114 are arranged in a state where their relative positional relationship is restricted. That is, the transmission/reception parts 110, 114 are arranged so that their relative positional relationship is within a predetermined range even when they are rotated around the rotation axis AR.

Here, the relative positional relationship of the transmission/reception parts 110, 114 is a distance (separation distance) at which the transmission/reception parts 110, 114 are spaced from each other along the rotation axis AR, the area (facing area) of regions facing each other, an angle with respect to the rotation axis AR, and so on. In the embodiment, the transmission/reception parts 110, 114 are arranged in parallel to each other. This is one example of the arrangement in the state where the relative positional relationship is restricted.

By restricting the relative positional relationship of the transmission/reception parts 110, 114, the transmission/reception parts 110, 114 can magnetically be coupled at a relatively stable strength in a predetermined range regardless of the bending/stretching state and the bending/stretching operation of the arm parts 101, 102. Therefore, even when the wireless connector 100 is arranged outside the arm parts 101, 102, stable wireless power transmission can be performed.

(Wireless Connector Attachment/Detachment Method according to First Embodiment)

Hereinbefore, the operation of the wireless connector 100 according to the first embodiment of the present invention has been described. Now, a wireless connector attachment/detachment method according to the present embodiment will be described with reference to FIGS. 7 to 8.

The wireless connector attachment/detachment method according to the present embodiment is a method for attaching/detaching the wireless connector 100 to/from the arm parts 101, 102, and includes an attaching method and a detaching method for the wireless connector 100.

(Attaching Method for Wireless Connector 100)

Figure 7:
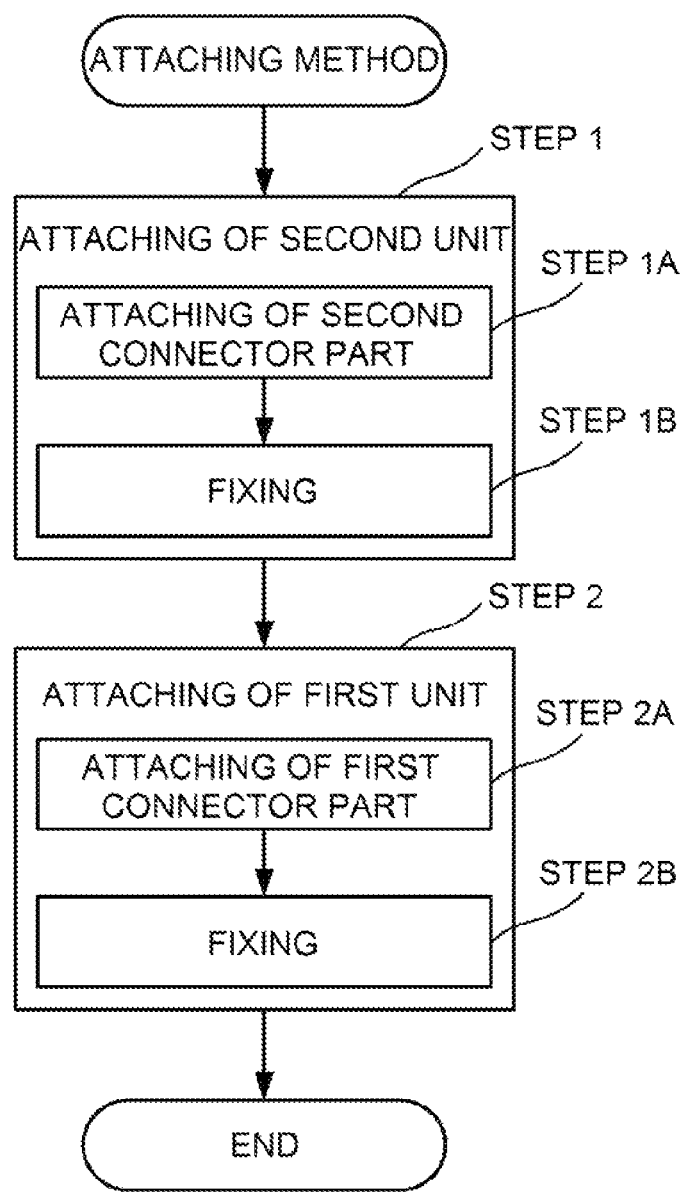
FIG. 7 is a diagram showing a flow of an attaching method for the wireless connector according to the first embodiment.

FIG. 7 is a flowchart showing a flow of the attaching method for the wireless connector 100. The attaching method for the wireless connector 100 is started by preparing a robot device including the arm parts 101, 102 connected via the joint mechanism 103, and the wireless connector 100.

As shown in FIG. 7, the second unit 107 is attached to the second arm part 102 from the outside of the second arm part 102 (step 1; step of attaching the second unit).

Specifically, in the step 1, the second connector part 113 is attached to the second arm part 102 in a state where the second transmission/reception part 114 is positioned in front of the joint mechanism 103 on the rotation axis AR (step 1A; step of attaching the second connector part).

In the present embodiment, by fitting the second mating connector part 105, the second connector part 113 is attached to the second arm part 102. Since the second mating connector part 105 is exposed to the outside of the second arm part 102, the second connector part 113 is attached to the second arm part 102 from the outside of the second arm part 102.

By attaching the second connector part 113 in the above-mentioned manner, the second connector part 113 and the second mating connector part 105 are electrically connected. In the present embodiment, since the second connector part 113 is fixed to the second housing 112, the second housing 112 is attached to the second arm part 102 together with the second connector part 113. As a result, the second unit 107 is attached to the second arm part 102.

As shown in FIG. 7, the second unit 107 is fixed to the second arm part 102 (step 1B; fixing step)

In the present embodiment, the second bolts 129 are inserted into the second bolt holes 127, respectively, and fitted to second threaded hole parts 132 provided in the second arm part 102 by a screw action, so that the second housing 112 is fixed to the second arm part 102 The method for fixing the second unit 107 to the second arm part 102 is not limited to bolt fastening, and may be, for example, locking by engagement between lances and a peripheral portion of the second opening 126.

As shown in FIG. 7, the first unit 106 is attached to the first arm part 101 from the outside of the first arm part 101 (step 2; step of attaching the first unit).

Specifically, in the step 2, in a state where the first transmission/reception part 110 is positioned in front of the joint mechanism 103 and the second transmission/reception part 114 on the rotation axis AR, the first connector part 109 is attached to the first arm unit 101 (step 2A; step of attaching the first connector part).

In the present embodiment, by fitting the first mating connector part 104, the first connector part 109 is attached to the first arm part 101. Since the first mating connector part 104 is exposed to the outside of the first arm part 101, the first connector part 109 is attached to the first arm part 101 from the outside of the first arm part 101.

By attaching the first connector part 109 in the above-mentioned manner, the first connector part 109 and the first mating connector part 104 are electrically connected. In the present embodiment, since the first connector part 109 is fixed to the first housing 108, the first housing 108 is attached to the first arm part 101 together with the first connector part 109. As a result, the first unit 106 is attached to the first arm part 101.

As shown in FIG. 7, the first unit 106 is fixed to the first arm part 101 (step 2B; fixing step).

In the present embodiment, the first bolts 128 are inserted into the first bolt holes 125, respectively, and fitted to first threaded hole parts 133 provided in the first arm part 101 by a screw action, so that the first housing 108 is fixed to the first arm part 101. The method for fixing the first unit 106 to the first arm part 101 is not limited to bolt fastening, and may be, for example, locking by engagement between lances and a peripheral portion of the first opening 124.

Thus, the attaching method for the wireless connector 100 is finished, and the wireless connector 100 is mounted in a state of being fixed to the first arm part 101 and the second arm part 102. The transmission/reception parts 110, 114 are arranged to be substantially in parallel and to face a direction substantially perpendicular to the rotation axis AR in a state where the transmission/reception parts 110, 114 are spaced from and faced to each other along the rotation axis AR outside the joint mechanism 103 so as to wirelessly transmit electric power.

(Detaching Method for Wireless Connector 100)

Figure 8:
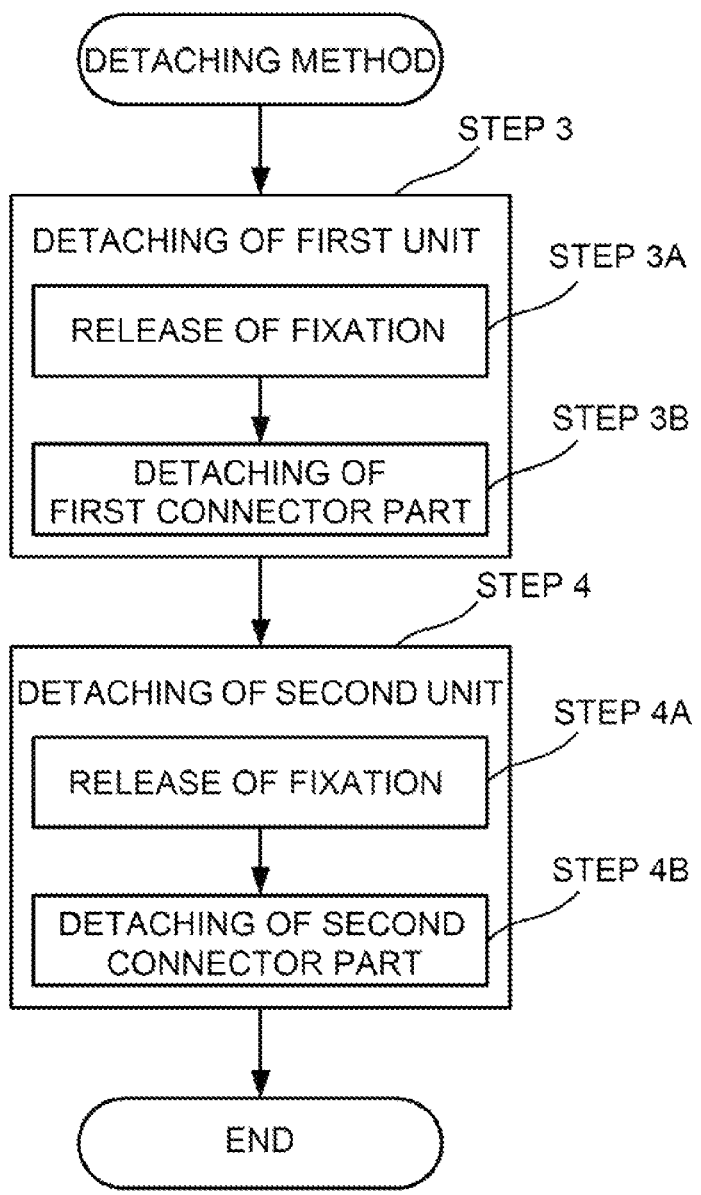
FIG. 8 is a diagram showing a flow of a detaching method for the wireless connector according to the first embodiment.

FIG. 8 is a flowchart illustrating a flow of the detaching method for the wireless connector 100. Typically, the detaching method for the wireless connector 100 is performed if necessary, after the wireless connector 100 is attached to the robot device by the above-described attaching method for the wireless connector 100. As an example of a case where the wireless connector 100 is required to be detached, there is a case where the wireless connector 100 in which a failure has occurred is replaced by a normal wireless connector 100 for the purpose of repair.

As shown in FIG. 8, the first unit 106 is detached from the first arm part 101 by work outside the first arm part 101 (step 3; step of detaching the first unit).

In detail, as shown in FIG. 8, fixation between the first unit 106 and the first arm part 101 is released (step 3A; fixation release step). In the present embodiment, after fitting of the first bolts 128 and the first threaded hole parts 133 by the screw action is released, the first bolts 128 are detached from the first bolt holes 125.

As shown in FIG. 8, the first connector part 109 is detached from the first arm part 101 (step 3B; step of detaching the first connector part).

In the present embodiment, for example, a worker grips the first housing 108 by using a hand, a jig, or the like outside the first arm part 101. Then, by pulling out the first connector part 109 from the first mating connector part 104, the first connector part 109 is detached from the first arm part 101.

In the present embodiment, since the first connector part 109 is fixed to the first housing 108, the first housing 108 is detached from the first arm part 101 together with the first connector part 109. Thus, the first unit 106 is detached from the first arm part 101.

As shown in FIG. 8, the second unit 107 is detached from the second arm part 102 by work outside the second arm part 102 (step 4; step of detaching the second unit).

In detail, as shown in FIG. 8, fixation between the second unit 107 and the second arm part 102 is released (step 4A; fixation release step). In the present embodiment, after fitting of the second bolts 129 and the second threaded hole parts 132 by the screw action is released, the second bolts 129 are detached from the second bolt holes 127.

As shown in FIG. 8, the second connector part 113 is detached from the second arm part 102 (step 4B; step of detaching the second connector part).

In the present embodiment, for example, a worker grips the second housing 112 by using a hand, a jig, or the like outside the second arm part 102. Then, by pulling out the second connector part 113 from the second mating connector part 105, the second connector part 113 is detached from the second arm part 102.

In this embodiment, since the second connector part 113 is fixed to the second housing 112, the second housing 112 is detached from the first arm part 101 together with the second connector part 113. Thus, the second unit 107 is detached from the second arm part 102.

The detaching method for the wireless connector 100 is finished, and the wireless connector 100 is detached from the arm parts 101, 102.

Hereinbefore, the first embodiment of the present invention has been described.

According to the present embodiment, the wireless connector 100 can be attached to and detached from the arm parts 101, 102 by work outside the arm parts 101, 102. As a result, for example, the wireless connector 100 in which a failure has occurred can easily be replaced by a normal wireless connector 100. Therefore, the wireless connector 100 can easily be repaired.

The wireless connector 100 is attached to the arm parts 101, 102 in a state of being disposed outside the arm parts 101, 102. Therefore, as compared with a case where the wireless connector is provided inside the arm parts 101, 102, the influence on a design of the inside of the arm parts 101, 102 is reduced. Therefore, it is possible to improve the degree of freedom in the design of the arm parts 101, 102.

In the present embodiment, both of a fitting direction of the first connector part 109 and the first mating connector part 104 and a fitting direction of the second connector part 113 and the second mating connector part 105 are the same back-and-forth direction. The transmission/reception parts 110, 114 are arranged in a state of being spaced from and faced to each other along the fitting direction to cause magnetic field coupling therebetween.

In this case, in the arm parts 101, 102, the first mating connector part 104 and the second mating connector part 105 may be provided in mutually opposite directions via the rotation axis AR of the joint mechanism 103. Therefore, the first mating connector part 104 and the second mating connector part 105 can easily be provided. Further, in the wireless connector 100, the configuration of the first unit 106 and the second unit 107 can be relatively simple, as will be understood from the foregoing description of the configuration.

Accordingly, the wireless connector 100 with a simple configuration can easily be provided to the arm parts 101, 102.

Further, according to the present embodiment, the first central axis C1 and the second central axis C2 are oriented in parallel in the back-and-forth direction, and are parallel to the fitting direction of the first connector part 109 and the second connector part 113. Thus, with a simple configuration, the first transmission/reception part 110 (first coil member) and the second transmission/reception part 114 (second coil member) can be arranged substantially in parallel with each other to cause excellent magnetic field coupling. Accordingly, it is possible to wirelessly transmit electric power with a simple configuration and in a good condition.

Hereinbefore, the first embodiment of the present invention has been described. The present invention is not limited to the present embodiment, and includes a configuration in which the first embodiment is modified as follows.

First Modification

In the first embodiment, the example in which the first connector part 109 and the second connector part 113 are fixed to the first housing 108 and the second housing 112, respectively, has been described. However, the first connector part 109 and the second connector part 113 may be attached without being fixed to the first housing 108 and the second housing 112, respectively.

Figure 9:
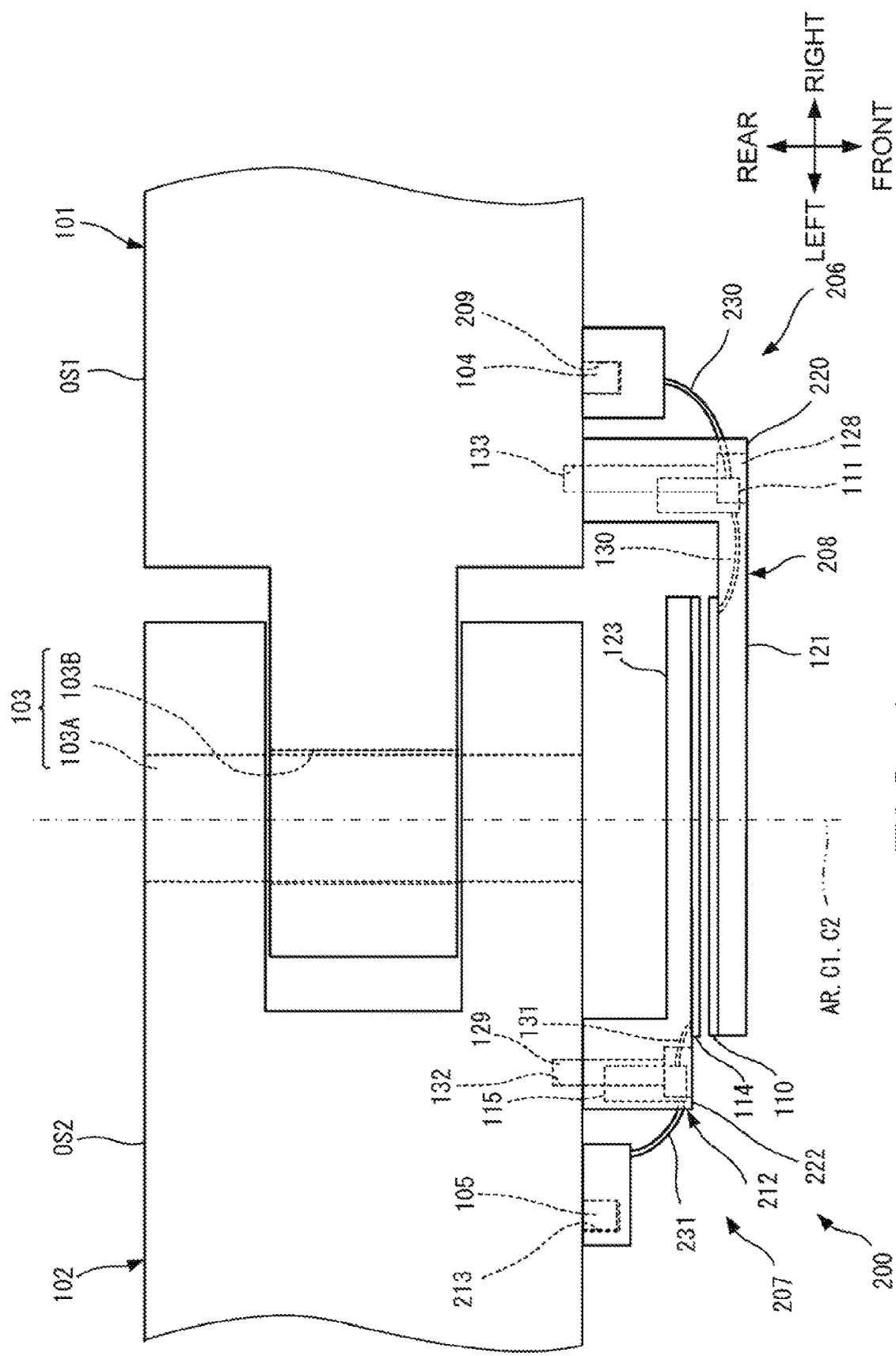
FIG. 9 is a view of a wireless connector attached to the first arm part and the second arm part according to a first modification as viewed from above.

As shown in FIG. 9, a wireless connector 200 according to the first modification includes a first unit 206 and a second unit 207 which are spaced from each other without coming into contact with each other in the manner similar to the first embodiment.

The first unit 206 includes the first transmission/reception part 110 and the first circuit part 111 which are similar to those of the first embodiment, and a first connector part 209 and a first housing 208 which are different from those of the first embodiment.

Similarly to the first embodiment, the first connector part 209 is an electric connector which is a part for transmitting electric power to/from the first arm part 101 and which is removably attached to the first mating connector part 104 by being fitted to each other. The first connector part 209 includes a first lead wire 230 extending to the outside of the first housing 208, and is connected to the first circuit part 111 provided inside the first housing 208 through the first lead wire 230.

The first housing 208 includes the first facing part 121, similar to that of the first embodiment, to which the first transmission/reception part 110 is fixed, and a first arm mounting part 220 different from that of the first embodiment.

The first arm mounting part 220 may be substantially similar in configuration to the first arm mounting part 120 according to the first embodiment except that the first connector part 109 is not provided inside.

The second unit 207 includes the second transmission/reception part 114 and the second circuit part 115 which are similar to those of the first embodiment, and a second connector part 213 and a second housing 212 which are different from those of the first embodiment.

Similarly to the first embodiment, the second connector part 213 is an electric connector which is a part for transmitting electric power to/from the second arm part 102 and which is removably attached to the second mating connector part 105 by being fitted to each other. The second connector part 213 includes a second lead wire 231 extending to the outside of the second housing 212, and is connected to the second circuit part 115 provided inside the second housing 212 through the second lead wire 231.

The second housing 212 includes the second facing part 123, similar to that of the first embodiment, to which the second transmission/reception part 114 is fixed, and a second arm mounting part 222 different from that of the first embodiment.

The second arm mounting part 222 may be substantially similar in configuration to the second arm mounting part 122 according to the first embodiment except that the second connector part 113 is not provided inside.

In the present modification also, when the wireless connector 200 is attached to the arm parts 101, 102, the transmission/reception parts 110, 114 are arranged in a state of being spaced from and faced to each other along the rotation axis AR outside the joint mechanism 103 so as to wirelessly transmit electric power by electromagnetic induction, as in the first embodiment. Thus, according to the wireless connector 200, electric power can be wirelessly transmitted between the arm parts 101, 102 in the manner similar to the first embodiment.

Further, the wireless connector 200 can be attached to and detached from the arm parts 101, 102 by work outside the arm parts 101, 102. As a result, for example, the wireless connector 200 in which a failure has occurred can easily be replaced by a normal wireless connector 200. Therefore, the wireless connector 200 can easily be repaired.

Second Through Fourth Modifications

In the embodiment, an example in which the first unit 106 and the second unit 107 are separated without coming into contact with each other has been described. However, the first unit 106 and the second unit 107 may be configured to contact each other as appropriate.

For example, the relative positional relationship of the transmission/reception parts 110, 114 may be out of a design range due to an impact or the like when a rotating operation is stopped. In such a case, there is a possibility that electric power cannot stably be transmitted. In order to prevent this, the first unit 106 and the second unit 107 may include a guide mechanism which limits the relative positional relationship of the transmission/reception parts 110, 114 in a predetermined range when they are attached to the arm parts 101, 102.

In the second through the fourth modifications, the guide mechanism is provided in the first unit 106 and the second unit 107. However, the guide mechanism may be provided in the first arm part 101, the second arm part 102, or the like.

Figure 10:
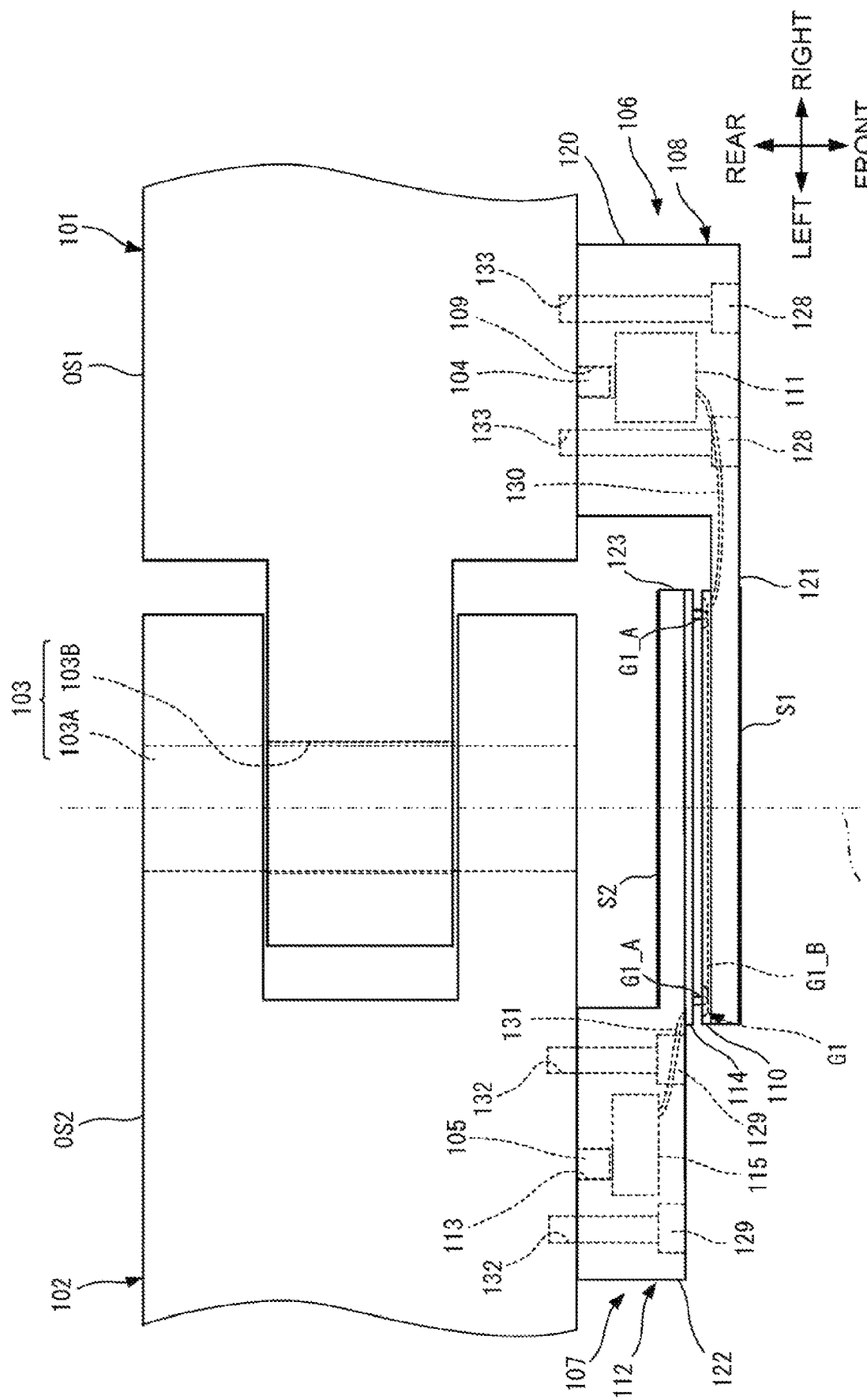
FIG. 10 is a view of a wireless connector attached to the first arm part and the second arm part according to a second modification as viewed from above.

As shown in FIG. 10, the guide mechanism G1 according to the second modification includes relatively small projections G1_A provided on a front surface of the second transmission/reception part 114 and an annular groove G1_B provided on a rear surface of the first transmission/reception part 110. In this case, when the wireless connector is attached to the arm parts 101, 102, tips of the projections G1_A are fitted to the groove G1_B to come into contact with a bottom portion of the groove G1_B. The bottom portion of the groove G1_B is an annular flat surface having a width.

The bottom portion of the groove G1_B is the annular flat surface having the width. Therefore, when the first unit 106 and the second unit 107 are attached to the arm parts 101, 102, they can be rotated around the rotation axis AR even if a designed rotation axis and the rotation axis AR are not coincident.

The relative positional relationship between the transmission/reception parts 110, 114 is limited in the predetermined range by fitting the projections G1_A and the groove G1_B to each other. Thus, as described above, even when the wireless connector 100 is arranged outside the arm parts 101, 102, stable wireless power transmission can be performed.

Figure 11:
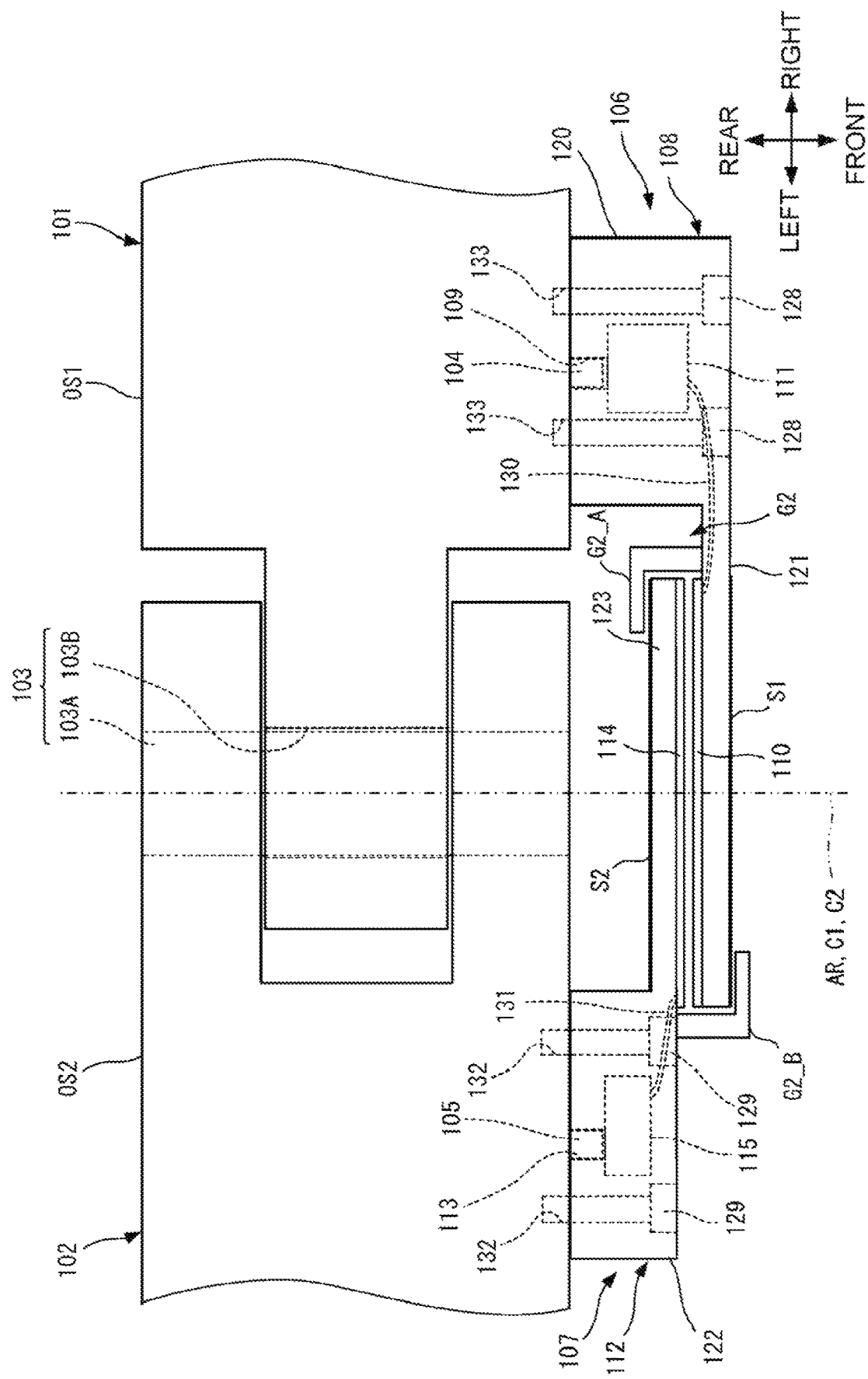
FIG. 11 is a view of a wireless connector attached to the first arm part and the second arm part according to a third modification as viewed from above.

As shown in FIG. 11, the guide mechanism G2 according to the third modification includes a first protruding part G2_A provided in the first housing 108 and a second protruding part G2_B provided in the second housing 112.

The first protruding part G2_A covers at least a part of the periphery of the second facing part 123, and covers at least a part of the rear of the second facing part 123. The second protruding part G2_B covers at least a part of the periphery of the first facing part 121, and covers at least a part of the front of the first facing part 121.

The first protruding part G2_A is provided with a gap left from the second facing part 123. The second protruding part G2_B is provided with a gap left from the first facing part 121. Thus, when the first unit 106 and the second unit 107 are attached to the arm parts 101, 102, they can be rotated around the rotation axis AR even if a designed rotation axis and the rotation axis AR are not coincident.

Since the relative movement between the second arm mounting part 122 and the first arm mounting part 120 is limited by the first protruding part G2_A and the second protruding part G2_B, the relative positional relationship between the transmission/reception parts 110, 114 is limited in a predetermined range. Thus, as described above, even when the wireless connector 100 is arranged outside the arm parts 101, 102, stable wireless power transmission can be performed.

Figure 12:
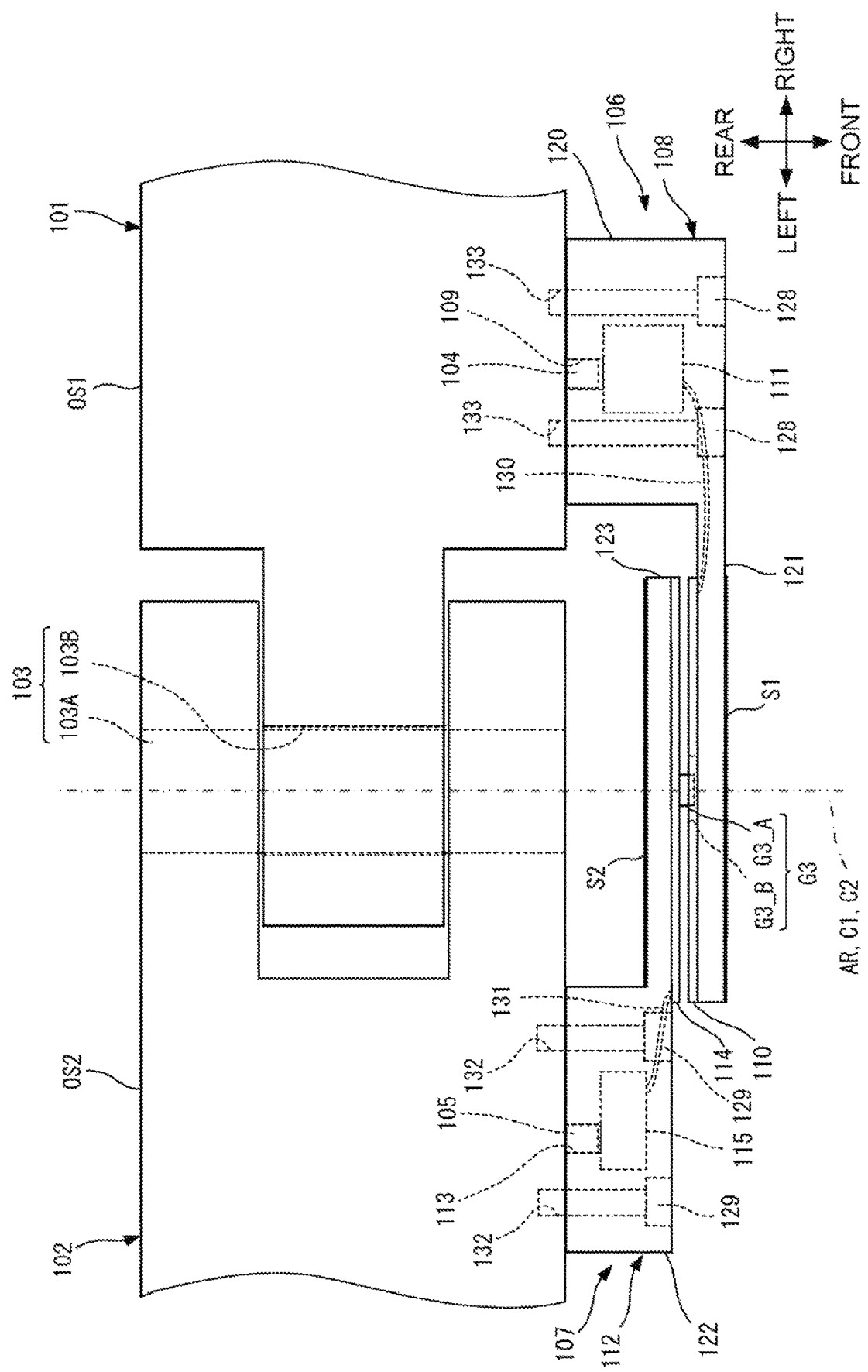
FIG. 12 is a view of a wireless connector attached to the first arm part and the second arm part according to a fourth modification as viewed from above.

As shown in FIG. 12, the guide mechanism G3 according to the fourth modification is composed of a shaft part G3_A which is provided in the second transmission/reception part 114 and whose axis substantially coincides with the second central axis C2, and a hole part G3_B which is provided in the first transmission/reception part 110 and whose center substantially coincides with the first central axis C1.

The shaft part G3_A and the hole part G3_B are loosely fitted to each other with a space left from each other. Thus, when the first unit 106 and the second unit 107 are attached to the arm parts 101, 102, they can be rotated around the rotation axis AR even if a designed rotation axis is not coincident with the rotation axis AR.

Since the relative movement between the second arm mounting part 122 and the first arm mounting part 120 is limited by the fitting of the shaft part G3_A and the hole part G3_B, the relative positional relationship between the transmission/reception parts 110, 114 is limited in a predetermined range. Thus, as described above, even when the wireless connector 100 is arranged outside the arm parts 101, 102, stable wireless power transmission can be performed.

Other Modifications

For example, in the first embodiment, an example in which electric power is transmitted as a to-be-transmitted target has been described. However, the to-be-transmitted target may be information or may be both electric power and information. In such a case, for example, the configuration of the first circuit part 111 and the second circuit part 115 of the wireless connector 100 according to the present embodiment may be changed depending on the to-be-transmitted target.

For example, in the first embodiment, an example in which the wireless connector 100 is attached to the arm parts 101,102 of the robot device has been described. However, an object to which the wireless connector 100 is attached is not limited to the robot device. The first arm part 101 is an example of a first object to which the first unit 106 is attached, while the second arm part 102 is an example of a second object to which the second unit 107 is attached. It is only necessary that the first object and the second object are rotatably connected to each other with the rotation axis AR as a fulcrum. Typically, the first object and the second object are mounted to various types of devices and apparatuses, and each have a length as in the first arm part 101 and the second arm part 102.

For example, in the first embodiment, transmission means for the to-be-transmitted target between the transmission/reception parts 110, 114 is electromagnetic induction. However, the transmission means is not limited to the electromagnetic induction, which is one mode of magnetic field coupling. The transmission means may be, for example, magnetic resonance which is another mode of magnetic field coupling, and may be electric field coupling similar to that between electrodes constituting a capacitor, transmission/reception of electromagnetic waves such as microwaves and light, and so on. The configurations of the first transmission/reception part 110, the second transmission/reception part 114, the first circuit part 111, and the second circuit part 115 may be changed depending on the transmission means between the transmission/reception parts 110, 114.

For example, in the first embodiment, an example in which the first transmission/reception part 110 is provided on the outer surface of the rear of the left end of the first facing part 121 while the second transmission/reception part 114 is provided on the outer surface of the front of the right end of the second facing part 123 has been described. However, places where the first transmission/reception part 110 and the second transmission/reception part 114 are provided are not limited thereto. The first transmission/reception part 110 and the second transmission/reception part 114 only have to be spaced from and faced to each other in a state where the to-be-transmitted target is wirelessly transmitted.

For example, the first transmission/reception part 110 and the second transmission/reception part 114 are provided in wall portions, adjacent to each other, of the first housing 108 and the second housing 112, respectively. In detail, for example, the first transmission/reception part 110 may be fixed to an inner surface of the rear of the left end of the first facing part 121 (that is, the rear in an inside of the first facing part 121), or may be fixed by being fitted to a hole formed at the rear of the left end of the first facing part 121. In detail, for example, the second transmission/reception part 114 may be fixed to an inner surface of the front of the right end of the second facing part 123 (that is, the front in an inside of the second facing part 123), or may be fixed by being fitted to a hole formed at the rear of the left end of the second facing part 123.

For example, in the first embodiment, an example in which the first transmission/reception part 110 and the second transmission/reception part 114 are disc-shaped has been described. However, the shape of each of the first transmission/reception part 110 and the second transmission/reception part 114 is not limited to the disc shape, and may be a flat plate shape of other configurations. The first transmission/reception part 110 and the second transmission/reception part 114 are not limited to the flat plate shape, and may have, for example, complementary three-dimensional shapes such as a mountain shape having a vertex on the first central axis C1 and a valley shape having a bottom on the second central axis C2. Similarly, the shapes of the first coil member and the second coil member included respectively in the first transmission/reception part 110 and the second transmission/reception part 114 are not limited to the disc shape, and may be a flat plate shape of other configurations, complementary three-dimensional shapes, or the like.

For example, in the first embodiment, an example in which the first connector part 109 and the first mating connector part 104 are electrically connected by being fitted to each other has been described. However, the first connector part and the first mating connector part are not limited to the electric connector, and may be constituted of, for example, an element, a component, or the like for wirelessly transmitting electric power by magnetic field coupling, electric field coupling, and transmission/reception of electromagnetic waves such as microwaves or light. Similarly, the second connector part 113 and the second mating connector part 105 may be configured to wirelessly transmit electric power.

For example, in the first embodiment, a case where the first unit 106 and the second unit 107 are structurally separated has been described by way of example. However, the first unit 106 and the second unit 107 may not structurally be separated but may be loosely connected.

For example, the first unit 106 and the second unit 107 can be connected by further deforming the shaft part and the hole part which are loosely fitted to each other as described in the fourth modification. That is, the hole part is may be arranged so that the hole part penetrates the first transmission/reception part 110 and the first facing part 121, and the shaft part penetrates through the hole part. A projecting part projecting with a radius larger than that of the hole part may be provided at the tip of the shaft part. The projecting part is locked to the hole part so that the first unit 106 and the second unit 107 are connected. However, the shaft part and the hole part are loosely fitted to each other with a space left therebetween.

Even with such deformation, when the first unit 106 and the second unit 107 are attached to the arm parts 101, 102, they can be rotated around the rotation axis AR even if the designed rotation axis is not coincident with the rotation axis AR. The relative positional relationship between the transmission/reception parts 110, 114 is limited in a predetermined range. Therefore, similarly to the fourth modification, even when the wireless connector 100 is arranged outside the arm parts 101, 102, stable wireless transmission of electric power can be performed.

Second Embodiment

In the first embodiment, an example in which the wireless connector 100 includes transmission/reception parts 110, 114 to wirelessly transmit electric power has been described. In the present embodiment, an example of a wireless connector will be described which includes a third transmission/reception part and a fourth transmission/reception part for transmitting information in addition to the first transmission/reception part and the second transmission/reception part for transmitting electric power.

The electric power according to the present embodiment is one example of a first to-be-transmitted target which is at least one of electric power and information, and the information is one example of a second to-be-transmitted target which is at least one of electric power and information.

(Configuration of Wireless Connector 300 According to Second Embodiment)

Figure 13:
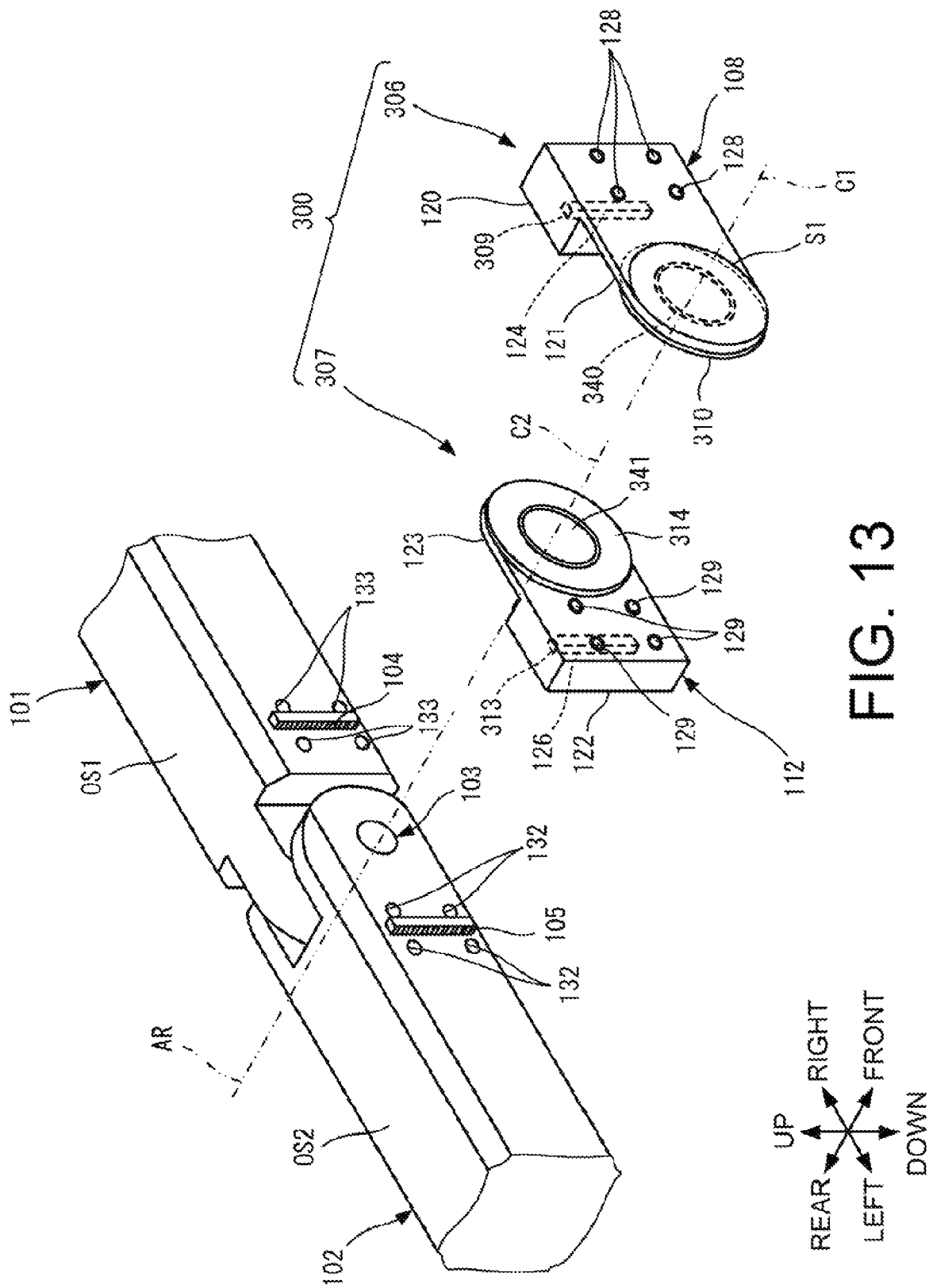
FIG. 13 is an exploded perspective view of the first arm part, the second arm part, and a wireless connector according to a second embodiment.

As shown in an exploded perspective view of FIG. 13, a wireless connector 300 according to the second embodiment of the present invention is a connector for wirelessly transmitting electric power and information between the first arm part 101 and the second arm part 102 similar to those of the first embodiment. The wireless connector 300 is removably attached to the outside of the arm parts 101, 102. In the present embodiment, an example in which electric power and information are wirelessly transmitted by magnetic field coupling (electromagnetic induction) and electromagnetic waves will be described As shown in FIG. 13, the wireless connector 300 includes a first unit 306 and a second unit 307 which are removably attached to the first arm part 101 and the second arm part 102 from the outside, respectively. The first unit 306 and the second unit 307 are spaced from each other without coming into contact with each other, as in the first embodiment.

Figure 14:
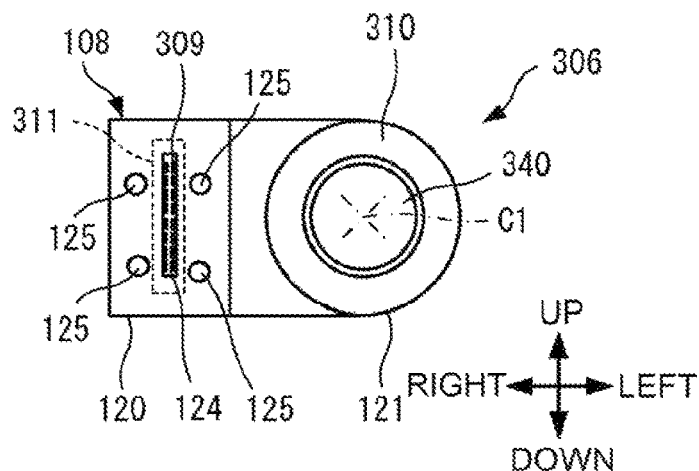
FIG. 14 is a view of a first unit according to the second embodiment as viewed from the rear.

As shown in FIG. 13 and FIG. 14 as viewed from the rear, the first unit 306 includes the first housing 108 similar to that of the first embodiment, and a first connector part 309, a first transmission/reception part 310, and a first circuit part 311 which are different from those of the first embodiment. Further, the first unit 306 includes a third transmission/reception part 340. In FIG. 14, the first bolts 128 similar to those of the first embodiment are omitted.

Figure 15:
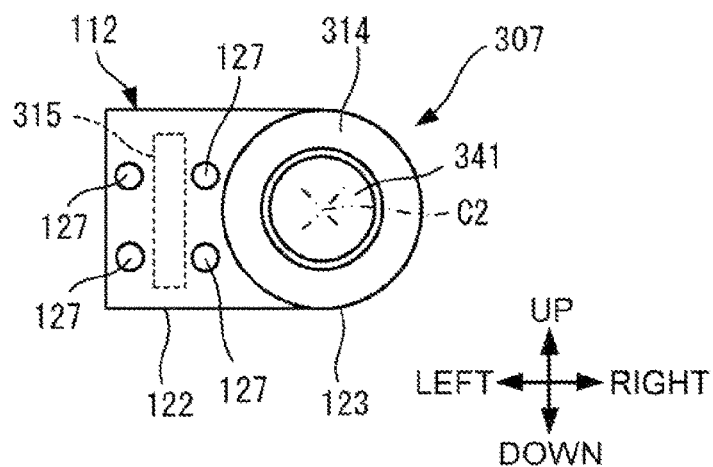
FIG. 15 is a view of a second unit according to the second embodiment as viewed from the front.

As shown in FIG. 13 and FIG. 15 as viewed from the front, the second unit 307 includes components 112, 313 to 315, and 341 corresponding to the components 108, 309 to 311, and 340 included in the first unit 306, respectively. Specifically, the second unit 307 includes the second housing 112 similar to that of the first embodiment, and a second connector part 313, a second transmission/reception part 314, and a second circuit part 315 which are different from those of the first embodiment. Further, the second unit 307 includes a fourth transmission/reception part 341. In FIG. 15, the second bolts 129 similar to those of the first embodiment are omitted.

The first connector part 309 is a part for transmitting electric power and information to/from the first arm part 101. The first connector part 309 is removably attached to the first arm part 101 from the outside of the first arm part 101, thereby transmitting electric power and information to/from the first arm part 101.

The first connector part 309 may be constituted substantially similarly to the first connector part 109 according to the first embodiment except that electric contacts for transmitting information are included in addition to the electric contacts for transmitting electric power.

The second connector part 313 is a part for transmitting electric power and information to/from the second arm part 102. The second connector part 313 is removably attached to the second arm part 102 from the outside of the second arm part 102, thereby transmitting electric power and information to/from the second arm part 102.

The second connector part 313 may be constituted substantially similarly to the second connector part 113 according to the first embodiment except that electric contacts for transmitting information are included in addition to the electric contacts for transmitting electric power.

The first transmission/reception part 310 and the second transmission/reception part 314 are members for wirelessly transmitting electric power therebetween, and are disposed to be spaced from and faced to each other along the rotation axis AR outside the joint mechanism 103 so as to wirelessly transmit electric power. Typically, the first transmission/reception part 310 and the second transmission/reception part 314 have a shape centered on the first central axis C1 and the second central axis C2, respectively, for example, a hollow disc shape.

The first transmission/reception part 310 and the second transmission/reception part 314 may be constituted similarly to the first transmission/reception part 110 and the second transmission/reception part 114 according to the first embodiment, respectively, except that those parts are hollow. That is, the first transmission/reception part 310 and the second transmission/reception part 314 according to the present embodiment are a first coil member and a second coil member, respectively, each of which has the hollow disc shape.

The third transmission/reception part 340 and the fourth transmission/reception part 341 are members for wirelessly transmitting information therebetween, and are disposed to be spaced from and faced to each other along the rotation axis AR outside the joint mechanism 103 so as to wirelessly transmit information. Typically, the third transmission/reception part 340 and the second transmission/reception part 321 have a shape centered on the first central axis C1 and the second central axis C2, respectively, for example, a disc shape.

The third transmission/reception part 340 and the fourth transmission/reception part 341 are provided inside the first transmission/reception part 310 and the second transmission/reception part 314, respectively.

In other words, the first transmission/reception part 310 is provided around the third transmission/reception part 340 and centered at the substantially common first central axis C1. The second transmission/reception part 314 is provided around the fourth transmission/reception part 341 and centered at the substantially common second central axis C2.

The third transmission/reception part 340 and the fourth transmission/reception part 341 may be constituted similarly to the first transmission/reception part 110 and the second transmission/reception part 114 according to the first embodiment except for places where they are arranged and a transmission method. That is, the third transmission/reception part 340 and the fourth transmission/reception part 341 according to the present embodiment are a first antenna member and a second antenna member, respectively, each of which has a disc shape.

The first circuit part 311 is an electric circuit electrically connected to the first connector part 309, the first transmission/reception part 310, and the third transmission/reception part 340. The first circuit part 311 may be substantially similar in configuration to the first circuit part 111 according to the first embodiment except that an information transmission/reception circuit for transmitting and/or receiving information is further included. Here, "transmitting and/or receiving" means that one or both of transmission and reception are performed. The same applies also in the following.

The second circuit part 315 is an electric circuit electrically connected to the second connector part 313, the second transmission/reception part 314, and the fourth transmission/reception part 341. The second circuit part 315 may be substantially similar in configuration to the second circuit part 115 according to the first embodiment except that an information transmission/reception circuit for transmitting and/or receiving information is further included.

In the present embodiment also, the first unit 306 and the second unit 307 are spaced from each other without coming into contact with each other. Therefore, similarly to the first embodiment, when the first unit 306 and the second unit 307 are attached to the arm parts 101, 102, they can be rotated around the rotation axis AR in accordance with the bending and stretching of the arm parts 101, 102 even if a designed rotation axis is not coincident with the rotation axis AR.

(Operation of Wireless Connector 300 according to Second Embodiment) Hereinbefore, the configuration of the wireless connector 300 according to the second embodiment of the present invention has been described. Now, the operation of the wireless connector 300 according to the present embodiment will be described with reference to the circuit configuration diagram of FIG. 16.

Figure 16:
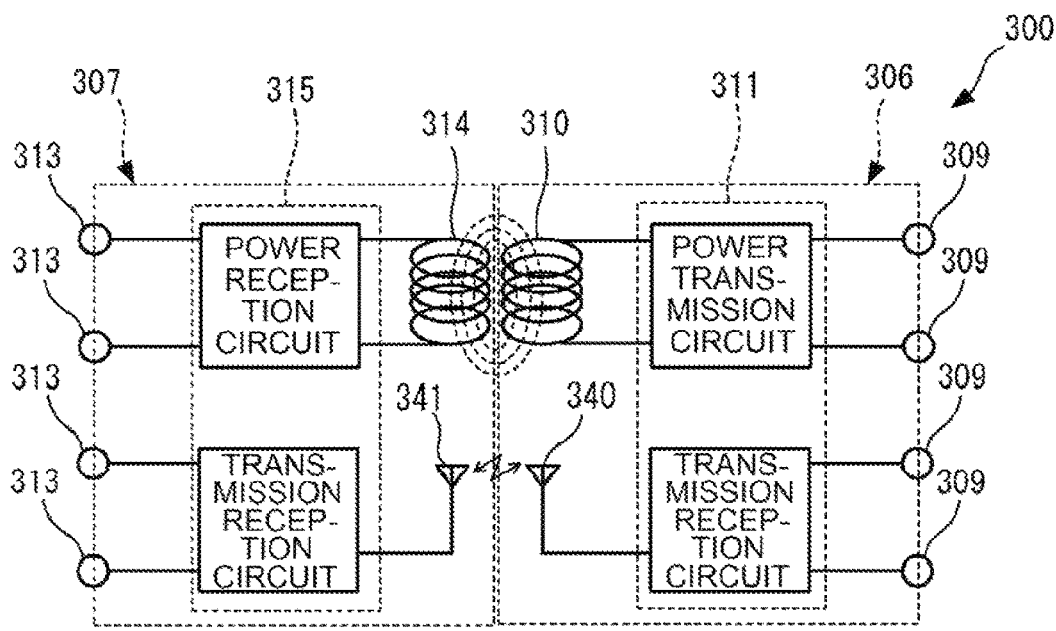
FIG. 16 is a diagram showing a circuit configuration in the wireless connector according to the second embodiment.
Figure 17A:
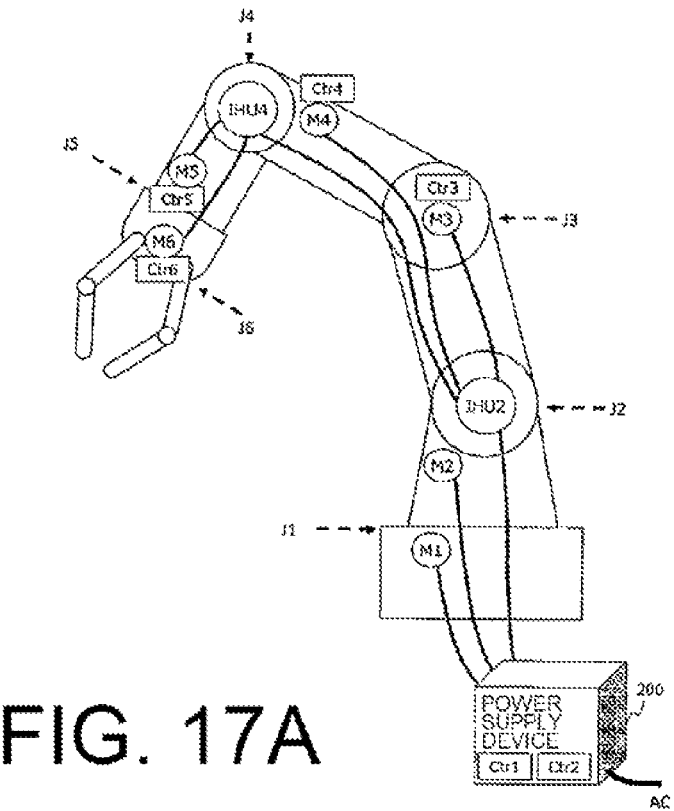
FIG. 17A is a diagram showing a configuration of a robot arm device according to the related art.
Figure 17B:
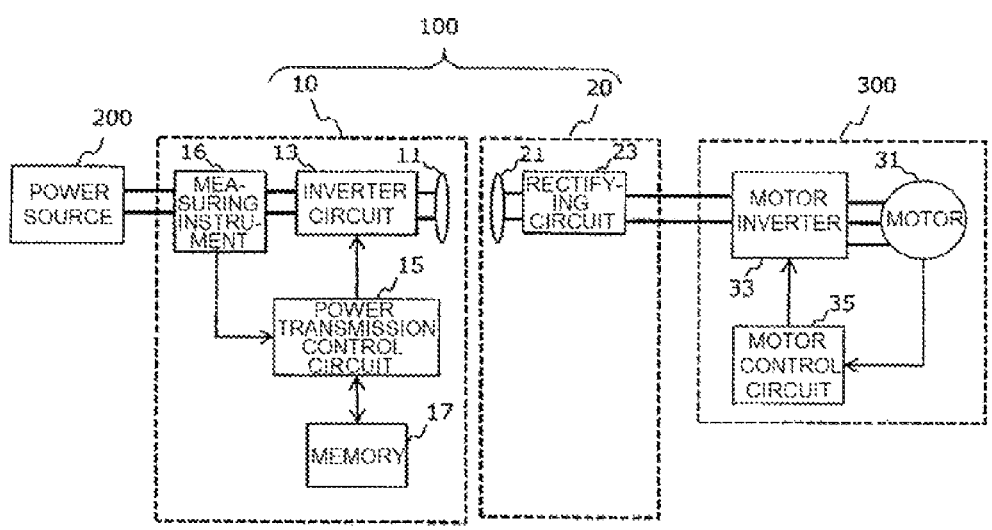
FIG. 17B is a diagram showing a circuit configuration in the robot arm device.

As described above, the transmission/reception parts 310, 314 are arranged to be spaced from and faced to each other along the rotation axis AR. As a result, as shown in FIG. 16, the first transmission/reception part 110 connected to a power transmission circuit included in the first circuit part 311 and the second transmission/reception part 314 connected to the power reception circuit included in the second circuit part 315 can be magnetically coupled by electromagnetic induction. Therefore, by operating in the manner similar to the wireless connector 100 described with reference to FIG. 6, electric power can be transmitted wirelessly between the first arm part 101 and the second arm part 102. Here, the "transmission/reception parts 310, 314" is a generic term including the first transmission/reception part 310 and the second transmission/reception part 314. The same also applies in the following.

Since the transmission/reception parts 310, 314 are arranged to be spaced from and faced to each other along the rotation axis AR, they are magnetically coupled by electromagnetic induction even when the first unit 106 and the second unit 107 are rotated around the rotation axis AR. As a result, similarly to the transmission/reception parts 110, 114 according to the first embodiment, the wireless connector 300 can wirelessly transmit electric power between the first arm part 101 and the second arm part 102 regardless of the state and the operation of bending and stretching of the arm parts 101, 102.

The transmission/reception parts 340, 341 wirelessly transmit information by electromagnetic waves such as microwaves or light. Here, the "transmission/reception parts 340, 341" is a generic term including the third transmission/reception part 340 and the fourth transmission/reception part 341. The same applies also in the following.

Specifically, the transmission/reception parts 340, 341 are arranged to be spaced from and faced to each other along the rotation axis AR, as described above. As a result, as shown in FIG. 16, the third transmission/reception part 340 connected to the information transmission/reception circuit included in the first circuit part 311 and the fourth transmission/reception part 341 connected to the information transmission/reception circuit included in the second circuit part 315 can transmit and receive electromagnetic waves to/from each other. Therefore, for example, an electric signal including information from the first arm part 101 is transmitted to the third transmission/reception part 340 through the first connector part 309 and the first circuit part 311 (information transmission/reception circuit), and is received by the fourth transmission/reception part 341 as an electromagnetic wave including the information. The fourth transmission/reception part 341 converts the received electromagnetic wave into an electric signal including the information included in the electromagnetic wave, and outputs the electric signal. The electric signal including the information from the fourth transmission/reception part 341 is transmitted to the second arm part 102 through the second circuit part 315 (information transmission/reception circuit) and the second connector part 313. By such an operation, the information can be transmitted wirelessly from the first arm part 101 to the second arm part 102.

When the information is transmitted from the second arm part 102 to the first arm part 101, the information may be transmitted in a reverse order to that mentioned above.

Specifically, an electric signal including information from the second arm part 102 is transmitted to the fourth transmission/reception part 341 through the second connector part 313 and the second circuit part 315 (information transmission/reception circuit), and is received by the third transmission/reception part 340 as an electromagnetic wave including the information. The third transmission/reception part 340 converts the received electromagnetic wave into an electric signal including the information included in the electromagnetic wave, and outputs the electric signal. The electric signal including the information from the third transmission/reception part 340 is transmitted to the first arm part 101 through the first circuit part 311 (information transmission/reception circuit) and the first connector part 309.

Since the transmission/reception parts 340, 341 are arranged to be spaced from and faced to each other along the rotation axis AR, information is wirelessly transmitted even when the first unit 106 and the second unit 107 are rotated around the rotation axis AR. As a result, the wireless connector 300 can operate as described above regardless of the state and the operation of bending and stretching of the arm parts 101, 102, so that the information can be transmitted wirelessly between the first arm part 101 and the second arm part 102.

(Wireless Connector Attachment/Detachment Method according to Second Embodiment)

Hereinbefore, the operation of the wireless connector 300 according to the second embodiment of the present invention has been described. Now, a wireless connector attachment/detachment method according to the present embodiment will be described.

The wireless connector attachment/detachment method according to the present embodiment is a method for attaching/detaching the wireless connector 300 to/from the arm parts 101, 102, and includes an attaching method and a detaching method for the wireless connector 300. The attaching method and the detaching method for the wireless connector 300 are the same as the attaching method and the detaching method for the wireless connector 100 according to the first embodiment, respectively. That is, in the description of the wireless connector attachment/detachment method according to the first embodiment, the components of the wireless connector 100 according to the first embodiment may be replaced by the respective corresponding components of the wireless connector 300 according to the second embodiment. In order to simplify the description, detailed description of the attaching method and the detaching method for the wireless connector 300 will be omitted.

Hereinbefore, the second embodiment of the present invention has been described.

In the present embodiment also, the wireless connector 300 can be attached to and detached from the arm parts 101, 102 by work outside the arm parts 101, 102. As a result, for example, the wireless connector 300 in which a failure has occurred can easily be replaced by a normal wireless connector 300. Therefore, the wireless connector 300 can easily be repaired. In addition, the present embodiment exhibits the effects similar to those of the first embodiment.

In the present embodiment, not only the transmission/reception parts 310, 314 but also the transmission/reception parts 340, 341 are also arranged in parallel to each other. By limiting the relative positional relationship of the transmission/reception parts 340, 341, the transmission/reception parts 340, 341 can be magnetically coupled to each other at a relatively stable strength within a predetermined range, regardless of the bending/stretching states and the bending/stretching operations of the arm parts 101, 102, similarly to the transmission/reception parts 110, 114 according to the first embodiment. Therefore, even when the wireless connector 300 is arranged outside the arm parts 101, 102, stable wireless transmission of electric power and information is enabled.

Although the embodiments and the modifications of the present invention have been described above, the present invention is not limited thereto. For example, the present invention includes a mode obtained by appropriately combining some or all of the embodiments and the modifications described above, and a mode obtained by appropriately changing the above-mentioned mode.

The present application is based on Japanese Patent Application No. 2019-226372, filed on Dec. 16, 2019. The specification, the scope of the claims, and the entirety of the drawings of Japanese Patent Application No. 2019-226372 are incorporated in the present specification.

DESCRIPTION OF REFERENCE NUMERALS

100, 200, 300 wireless connector
101 first arm part
102 second arm part
103 joint mechanism 103A shaft part
103B hole part
104 first mating connector part
105 second mating connector part
106, 206, 306 first unit
107, 207, 307 second unit
108, 208 first housing
109, 209, 309 first connector part
110, 310 first transmission/reception part
111, 311 first circuit part
112, 212 second housing
113, 213, 313 second connector part
114, 314 second transmission/reception part
115, 315 second circuit part
120, 220 first arm mounting part
121 first facing part
122, 222 second arm mounting part
123 second facing part
124 first opening
125 first bolt hole
126 second opening
127 second bolt hole
128 first bolt
129 second bolt
130, 230 first lead wire
131, 231 second lead wire
132 second threaded hole part
133 first threaded hole part
340 third transmission/reception part
341 fourth transmission/reception part
OS1, OS2 outer shell
AR rotation axis
C1 first central axis
C2 second central axis
S1, S2 shield member
G1-G3 guide mechanism
G1_A projection
G1_B groove
G2_A first protruding part
G2_B second protruding part
G3_A shaft part
G3_B hole part

The invention claimed is:

1. A wireless connector attachment/detachment method for attaching/detaching a wireless connector to/from a first object and a second object, the wireless connector being configured to wirelessly transmit a to-be-transmitted target, which is at least one of electric power and information, between the first object and the second object which are rotatably connected with a rotation axis as a fulcrum via a joint mechanism,
the wireless connector comprising:
a first housing to which a first transmission/reception part configured to wirelessly transmit the to-be-transmitted target outside the joint mechanism, and a first connector part configured to transmit the to-be-transmitted target to/from the first object are fixed, and
a second housing to which a second transmission/reception part configured to wirelessly transmit the to-be-transmitted target to/from the first transmission/reception part outside the joint mechanism, and a second connector part configured to transmit the to-be-transmitted target to/from the second object are fixed,
wherein the wireless connector attachment/detachment method comprises:
attaching the first connector part to the first object from an outside of the first object outside the joint mechanism, and attaching the second connector part to the second object from an outside of the second object outside the joint mechanism, thereby attaching the wireless connector to the first object and the second object in a state where the first transmission/reception part and the second transmission/reception part are spaced from and faced to each other so as to wirelessly transmit the to-be-transmitted target outside the joint mechanism, and
detaching the first connector part from the first object by work outside the first object, and detaching the second connector part from the second object by work outside the second object, thereby detaching the wireless connector from the first object and the second object.

2. A robot device comprising:
a first arm part and a second arm part which are connected via a joint mechanism configured to rotatably connect the first and the second arm parts with a rotation axis as a fulcrum, and
a wireless connector configured to wirelessly transmit a to-be-transmitted target, which is at least one of electric power and information, between the first arm part and the second arm part outside the joint mechanism,
wherein:
the first arm part includes a first mating connector part exposed to an outside of the first arm part, and
the second arm part includes a second mating connector part exposed to an outside of the second arm part,
wherein the wireless connector comprises:
a first housing to which a first transmission/reception part configured to wirelessly transmit the to-be-transmitted target outside the joint mechanism, and a first connector part configured to transmit the to-be-transmitted target to/from the first object by being removably attached to the first mating connector are fixed; and
a second housing to which a second transmission/reception part configured to wirelessly transmit the to-be-transmitted target to/from the first transmission/reception part outside the joint mechanism, and a second connector part configured to transmit the to-be-transmitted target to/from the second object by being removably attached to the second mating connector are fixed,
wherein, when the first connector part and the second connector part are attached to the first mating connector part and the second mating connector part, respectively, the first transmission/reception part and the second transmission/reception part are arranged to be spaced from and faced to each other along the rotation axis so as to wirelessly transmit the to-be-transmitted target outside the joint mechanism.

3. A wireless connector for wirelessly transmitting a first to-be-transmitted target, which is electric power, between a first object and a second object which are rotatably connected with a rotation axis as a fulcrum via a joint mechanism, wherein the wireless connector comprises:
a first unit removably attached to the first object from an outside of the first object, and
a second unit removably attached to the second object from an outside of the second object,
wherein the first unit comprises:
a first transmission/reception part configured to wirelessly transmit the first to-be-transmitted target outside the joint mechanism;
a first connector part configured to transmit the first to-be-transmitted target to/from the first object by being removably attached to the first object from the outside of the first object; and a first housing to which the first transmission/reception part and the first connector part are fixed, wherein the second unit comprises:

a second transmission/reception part configured to wirelessly transmit the first to-be-transmitted target to/from the first transmission/reception part outside the joint mechanism;

a second connector part configured to transmit the first to-be-transmitted target to/from the second object by being removably attached to the second object from the outside of the second object; and a second housing to which the second transmission/reception part and the second connector part are fixed, wherein, when the first unit and the second unit are attached to the first object and the second object, respectively, the first transmission/reception part and the second transmission/reception part are arranged to be spaced from and faced to each other so as to wirelessly transmit the first to-be-transmitted target.

4. The wireless connector according to claim 3, wherein:

the first transmission/reception part includes a first coil member of a flat-plate-like shape configured to transmit the first to-be-transmitted target, and the second transmission/reception part includes a second coil member of a flat-plate-like shape configured to transmit the first to-be-transmitted target by magnetic-field coupling with the first coil member, wherein, when the first unit and the second unit are attached to the first object and the second object, respectively, the first coil member and the second coil member are arranged in parallel in a state of being spaced from and faced to each other so as to wirelessly transmit the first to-be-transmitted target outside the joint mechanism.

5. The wireless connector according to claim 3, wherein:

the first unit further includes a third transmission/reception part fixed to the first housing and configured to wirelessly transmit a second to-be-transmitted target that is information, the second unit further includes a fourth transmission/reception part fixed to the second housing and configured to wirelessly transmit the second to-be-transmitted target to/from the third transmission/reception part, the first connector part is configured to transmit the first to-be-transmitted target and the second to-be-transmitted target to/from the first object by being removably attached to the first object from the outside of the first object, the second connector part is configured to transmit the first to-be-transmitted target and the second to-be-transmitted target to/from the second object by being removably attached to the second object from the outside of the second object, wherein, when the first unit and the second unit are attached to the first object and the second object, respectively, the third transmission/reception part and the fourth transmission/reception part are arranged to be spaced from and faced to each other so as to wirelessly transmit the second to-be-transmitted target outside the joint mechanism.

6. The wireless connector according to claim 5, wherein:

the third transmission/reception part includes a first antenna member configured to transmit the second to-be-transmitted target that is information, the fourth transmission/reception part includes a second antenna member configured to transmit the second to-be-transmitted target, the first transmission/reception part is provided around the third transmission/reception part, the second transmission/reception part is provided around the fourth transmission/reception part, wherein, when the first unit and the second unit are attached to the first object and the second object, respectively, the first antenna member and the second antenna member are arranged in parallel in a state of being spaced from and faced to each other so as to wirelessly transmit the second to-be-transmitted target outside the joint mechanism.

7. A wireless connector for wirelessly transmitting, between a first object and a second object, at least one of electric power and information as a to-be-transmitted target, the first object and the second object being rotatably connected with a rotation axis as a fulcrum via a joint mechanism, wherein the wireless connector comprises:

a first unit removably attached to the first object from an outside of the first object, and a second unit removably attached to the second object from an outside of the second object, wherein the first unit comprises:

a first transmission/reception part including a first coil member configured to wirelessly transmit the to-be-transmitted target outside the joint mechanism;

a first connector part removably attached to the first object so as to transmit the to-be-transmitted target to/from the first object by being fitted to the first object from the outside of the first object; and a first housing to which the first coil member and the first connector part are fixed, wherein the second unit comprises:

a second transmission/reception part including a second coil member configured to wirelessly transmit the to-be-transmitted target to/from the first coil member outside the joint mechanism;

a second connector part removably attached to the second object so as to transmit the to-be-transmitted target to/from the second object by being fitted to the second object from the outside of the second object; and a second housing to which the second coil member and the second connector part are fixed, the first connector part and the second connector part having the same fitting direction, the first coil member and the second coil member being arranged to be spaced from and faced to each other along the fitting direction to cause magnetic field coupling therebetween.

8. The wireless connector according to claim 7, wherein:

the first coil member is disposed around a first central axis, the second coil member is disposed around a second central axis, the first central axis and the second central axis are parallel to the fitting direction.

9. A wireless connector for wirelessly transmitting, between a first object and a second object, at least one of electric power and information as a to-be-transmitted target, the first object and the second object being rotatably connected with a rotation axis as a fulcrum via a joint mechanism, wherein the wireless connector comprises:

a first unit removably attached to the first object from an outside of the first object; and a second unit removably attached to the second object from an outside of the second object, wherein the first unit comprises:

a first transmission/reception part including a first coil member configured to wirelessly transmit the to-be-transmitted target outside the joint mechanism;

a first connector part configured to transmit the to-be-transmitted target to/from the first object by being removably attached to the first object from the outside of the first object; and a first housing to which the first transmission/reception part and the first connector part are fixed, wherein the second unit comprises:

a second transmission/reception part including a second coil member configured to wirelessly transmit the to-be-transmitted target to/from the first transmission/reception part outside the joint mechanism;

a second connector part configured to transmit the to-be-transmitted target to/from the second object by being removably attached to the second object from the outside of the second object; and a second housing to which the second transmission/reception part and the second connector part are fixed, wherein the first coil member and the second coil member are spaced from and faced to each other in a state of being coupled to each other by magnetic field coupling.

10. A wireless connector for wirelessly transmitting, between a first object and a second object, a to-be-transmitted target which is at least one of electric power and information, the first object and the second object being rotatably connected with a rotation axis as a fulcrum via a joint mechanism, wherein the wireless connector comprises:

a first unit removably attached to the first object from an outside of the first object; and a second unit removably attached to the second object from an outside of the second object, wherein the first unit comprises:

a first transmission/reception part configured to wirelessly transmit the to-be-transmitted target outside the joint mechanism;

a first connector part configured to transmit the to-be-transmitted target to/from the first object by being attached to the first object; and a first housing to which the first transmission/reception part is fixed and to which the first connector part is attached, wherein the second unit comprises:

a second transmission/reception part configured to wirelessly transmit the to-be-transmitted target to/from the first transmission/reception part outside the joint mechanism;

a second connector part configured to transmit the to-be-transmitted target to/from the second object by being attached to the second object; and a second housing to which the second transmission/reception part is fixed and to which the second connector part is attached, wherein the first transmission/reception part and the second transmission/reception part are arranged to be spaced from and faced to each other so as to wirelessly transmit the to-be-transmitted target when the first unit and the second unit are attached to the first object and the second object, respectively.

11. The wireless connector according to claim 3, wherein:

when the first unit and the second unit are attached to the first object and the second object, respectively, the first transmission/reception part and the second transmission/reception part are arranged to be spaced from and faced to each other along the rotation axis.

12. The wireless connector according to claim 3, wherein:

the first unit and the second unit are spaced from each other when the first unit and the second unit are attached to the first object and the second object, respectively.

13. The wireless connector according to claim 3, wherein:

the first unit and the second unit further include a guide mechanism configured to limit a relative positional relationship between the first transmission/reception part and the second transmission/reception part within a predetermined range when the first unit and the second unit are attached to the first object and the second object, respectively.

* * * * *